(12) United States Patent
Nilsson et al.

(10) Patent No.: US 11,811,484 B2
(45) Date of Patent: Nov. 7, 2023

(54) APPARATUSES AND METHODS FOR MULTI-USER TRANSMISSIONS

(71) Applicant: Telefonaktiebolaget LM Ericsson (publ), Stockholm (SE)

(72) Inventors: Andreas Nilsson, Gothenburg (SE); Sebastian Faxér, Stockholm (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/607,997

(22) PCT Filed: Sep. 20, 2019

(86) PCT No.: PCT/EP2019/075419
§ 371 (c)(1),
(2) Date: Nov. 1, 2021

(87) PCT Pub. No.: WO2020/228970
PCT Pub. Date: Nov. 19, 2020

(65) Prior Publication Data
US 2022/0376767 A1    Nov. 24, 2022

Related U.S. Application Data

(60) Provisional application No. 62/847,021, filed on May 13, 2019.

(51) Int. Cl.
*H04L 1/02*   (2006.01)
*H04B 7/08*   (2006.01)
*H04B 7/0452*  (2017.01)

(52) U.S. Cl.
CPC .......... *H04B 7/088* (2013.01); *H04B 7/0452* (2013.01); *H04B 7/0862* (2013.01)

(58) Field of Classification Search
CPC .... H04B 7/0616; H04B 7/0695; H04B 7/088; H04B 7/02; H04L 5/0057; H04L 5/0073;
(Continued)

(56) References Cited

U.S. PATENT DOCUMENTS

2018/0288756 A1*  10/2018  Xia ...................... H04L 5/0023
2019/0069285 A1*  2/2019  Chandrasekhar ... H04W 72/048
(Continued)

FOREIGN PATENT DOCUMENTS

EP      3 471 328 A1    4/2019
WO      2018/083253 A1  5/2018

OTHER PUBLICATIONS

Samsung, "Corrections on Beam Reporting and Indication", 3GPP TSG RAN WG1 Meeting #93, R1-1806715, Busan, Korea, May 2018, 8 pages.
(Continued)

*Primary Examiner* — Khai Tran
(74) *Attorney, Agent, or Firm* — Rothwell, Figg, Ernst & Manbeck, P.C.

(57) ABSTRACT

A user equipment (UE) determines a receive (RX) spatial filter for receiving both a first measurement resource and a second measurement resource. The RX spatial filter is determined based on a first spatial quasi-co-located (QCL) reference associated with the first measurement resource and a second spatial QCL reference associated with the second, measurement resource. The UE measures the first and second measurement resources with the determined Rx filter configuration.

20 Claims, 20 Drawing Sheets

(58) Field of Classification Search
CPC .... H04L 5/0096; H04W 16/28; H04W 72/1289; H04W 64/003; H04W 72/04; H04W 72/0446
USPC .......................................... 375/267, 260, 262
See application file for complete search history.

(56) References Cited

U.S. PATENT DOCUMENTS

| | | | |
|---|---|---|---|
| 2020/0153497 A1* | 5/2020 | Tsai | H04B 7/0626 |
| 2020/0252951 A1* | 8/2020 | Frenne | H04L 5/0051 |
| 2020/0305088 A1* | 9/2020 | Nory | H04W 52/242 |
| 2021/0036833 A1* | 2/2021 | Yang | H04W 24/10 |
| 2021/0111846 A1* | 4/2021 | Lee | H04L 5/0057 |
| 2021/0344397 A1* | 11/2021 | Lee | H04B 7/0626 |
| 2022/0264348 A1* | 8/2022 | Manolakos | H04L 5/0073 |

OTHER PUBLICATIONS

Catt, "Discussion on DL beam management", 3GPP TSG RAN WG1 Meeting #89, R1-1707475, Hangzhou, China; May 2017, 10 pages.

Sony, "Remaining issues on downlink beam management", 3GPP TSG-RAN WG1 Meeting #92bis, R1-1804593, Sanya, China; Apr. 2018, 5 pages.

* cited by examiner

Prior Art
Prior Art
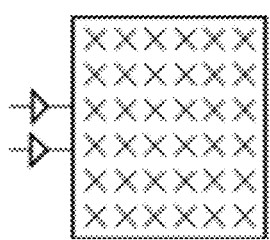
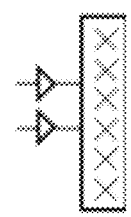
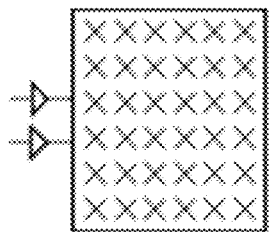
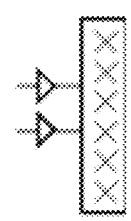
FIG. 2A
FIG. 2B

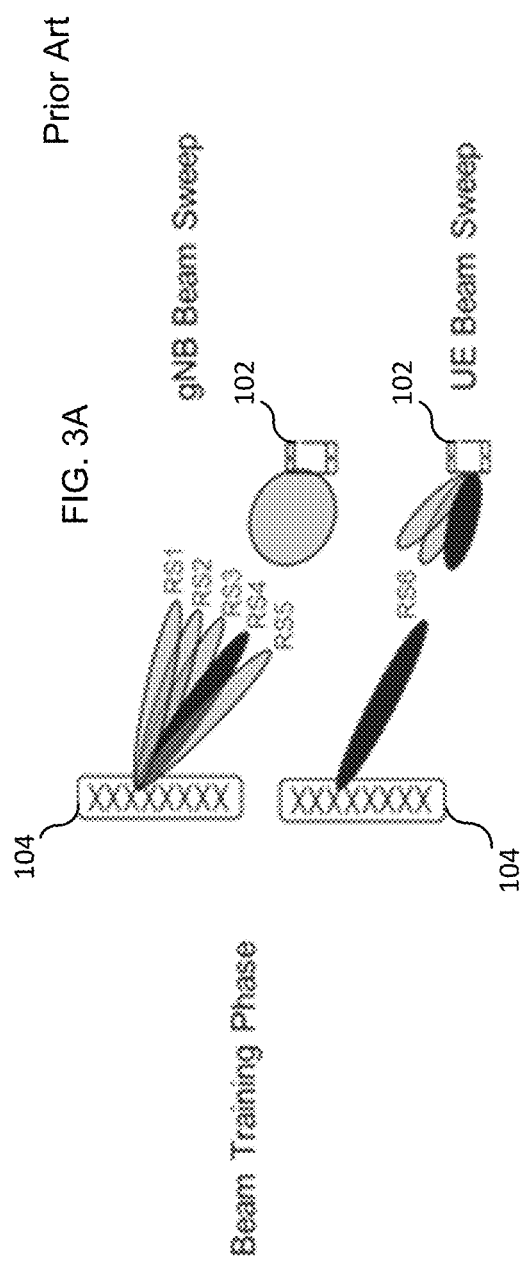
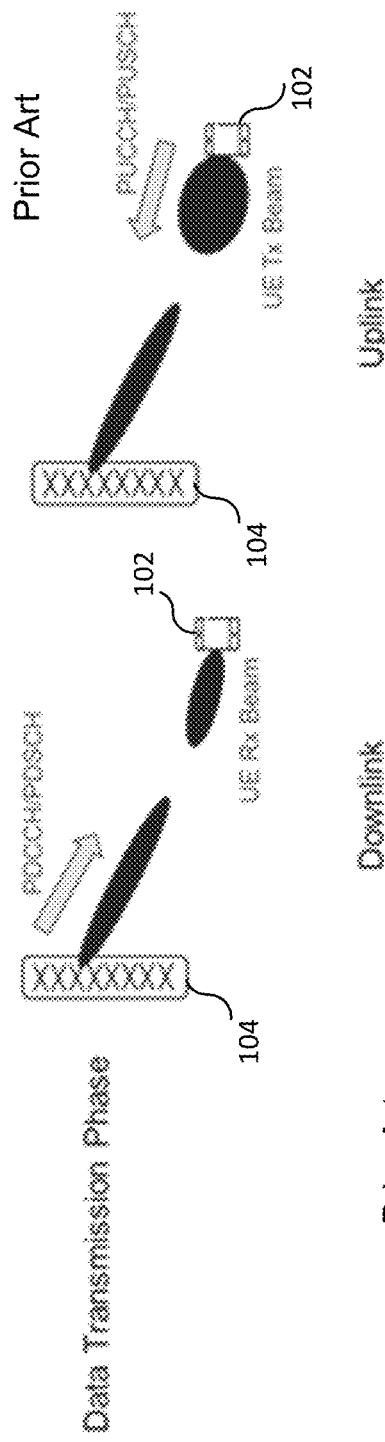
FIG. 3A  FIG. 3B  FIG. 3C  FIG. 3D

Prior Art

APPARATUSES AND METHODS FOR MULTI-USER TRANSMISSIONS

CROSS REFERENCE TO RELATED APPLICATION

This application is a 35 U.S.C. § 371 National Phase Entry Application from PCT/EP2019/075419, filed Sep. 20, 2019, designating the United States, which claims priority to U.S. provisional patent application No. 62/847,021, filed May 13, 2019, the disclosures of which are incorporated herein by reference in their entirety.

TECHNICAL FIELD

This disclosure relates to apparatuses and methods for multi-user transmissions (e.g., multi-user, multiple-input, multiple-output (MU-MIMO) transmissions). Some aspects of this disclosure relate to apparatuses and methods for determining a user equipment (UE) receive (RX) spatial filter for multi-user transmissions (e.g., MU-MIMO transmissions).

BACKGROUND

Beam Management

Narrow beam transmission and reception schemes are typically needed at higher frequencies to compensate for high propagation loss. For a given communication link, a beam can be applied at both the transmit/receive point (TRP) (i.e., an access point, such as a base station, or a component of an access point) and a user equipment (UE), which will be referred to as a beam pair link (BPL) in this disclosure.

A beam management procedure is employed to discover and maintain a TRP 104 beam 112 (e.g., a TRP transmit (TX) beam) and/or a UE 102 beam 116 (e.g., a UE receive (RX) beam). In the example of FIG. 1, one BPL has been discovered (i.e., the beam pair that consists of TRP beam 112 and UE beam 116) and is being maintained by the network. A BPL is expected to mainly be discovered and monitored by the network using measurements on downlink (DL) reference signals (RSs) used for beam management (e.g., channel-state-information RS (CSI-RS)). The CSI-RS for beam management can be transmitted periodically, semi-persistently, or aperiodic (event triggered), and they can be either shared between multiple UEs or be UE-specific. To find a suitable TRP TX beam, the TRP 104 transmits CSI-RS in different TRP TX beams on which the UE 102 performs reference-signal receive power (RSRP) measurements and reports back the N best TRP TX beams (where N can be configured by the network). Furthermore, the CSI-RS transmission on a given TRP TX beam can be repeated to allow the UE to evaluate suitable UE beams (UE RX beam training).

The large variety of requirements for the next generation of mobile communications system (5G) implies that frequency bands at many different carrier frequencies will be needed. For example, low bands may be needed to achieve sufficient coverage, and higher bands (e.g. mmW, i.e. near and above 30 GHz) may be needed to reach the required capacity. At high frequencies, the propagation properties are more challenging, and beamforming both at the TRP 104 (e.g., a 5G base station (a.k.a., gNB)) and at the UE 102 might be used to reach sufficient link budget.

There are basically three different implementations of beamforming, both at the TRP 104 and at the UE 102: 1) analog beamforming, 2) digital beamforming, and 3) hybrid beamforming. Each implementation has its pros and cons. Digital beamforming is the most flexible solution but also the costliest due to the large number of required radios and baseband chains.

Analog beamforming is the least flexible as it only allows a single beamforming weight applied across the whole bandwidth, but it is cheaper to manufacture due to reduced number of radio and baseband chains and due to the fact that it can be implemented on a time domain signal (as it is wideband). Hybrid beamforming is a compromise between the analog and digital beamforming where a few analog beams are formed and a digital precoder applies across these analog beams. Hence, the analog beamforming network reduces the dimensionality of the digital precoder, thereby reducing the cost, power consumption and complexity. One type of beamforming antenna architecture that has been agreed to study in 3GPP for the New Radio (NR) access technology in 5G is the concept of antenna panels, both at the TRP 104 and at the UE 102. An antenna panel (or "panel" for short) is an antenna array (e.g., a rectangular antenna array) of single-polarized or dual-polarized antenna elements with typically one transmit/receive unit (TX/RU) per polarization. An analog distribution network with phase shifters is used to steer the beam of each panel.

Multiple panels can be stacked next to each other and digital precoding can be performed across the panels, i.e. the same stream of data symbols are transmitted from each panel but with per subband phase adjustements to co-phase the transmissions from each panel at the receiver. FIG. 2A illustrates an example of a two two-dimensional dual-polarized panels, FIG. 2B illustrates an example of a two one-dimensional dual-polarized panels, and each panel is connected to one TX/RU per polarization.

At mmW frequencies, concepts for handling mobility between beams (both within and between TRPs) have been specified in NR. At these frequencies, where high-gain beamforming is used, each beam is only optimal to be used within a small geographical area, and the link budget when a terminal moves outside this beam deteriorates quickly. Hence, frequent and fast beam switching may be needed to maintain high performance. Here, switching is used for a system which use fixed beams. An alternative to fixed beams could be adaptive beams that follow the UE movements, and, in this case, the issue is one of tracking instead of switching.

To support such beam switching, a beam indication framework has been specified in NR. For example, for downlink data transmission (PDSCH), the downlink control information (DCI) contains a transmission configuration indicator (TCI) that informs the UE which beam is used so that it can adjust its receive beam accordingly. This is beneficial for the case of analog Rx beamforming, where the UE 102 needs to determine and apply the Rx beamforming weights before it can receive the PDSCH. This is a consequence of the constraint of time domain beamforming, which must be applied on the received signal before fast Fourier transform (FFT) processing and channel estimation.

In what follows, the terminology "spatial filtering weights" or "spatial filtering configuration" refers to the antenna weights that are applied at the transmitter (TRP or UE) and/or the receiver (UE or TRP) for data/control transmission/reception. This terminology is general in the sense that different propagation environments lead to different spatial filtering weights that match the transmission/reception of a signal to the channel. The spatial filtering weights do not in a general case result in a beam in a strict sense, where an ideal beam has one main beam direction and low sidelobes outside this main beam direction.

Prior to data transmission, a training phase is required in order to determine the TRP (e.g., gNB) and UE spatial filtering configurations. This is illustrated in FIG. 2 and is referred to in NR as downlink (DL) beam management. In NR, two types of reference signals (RSs) are used for DL beam management operations: (i) the channel state information RS (CSI-RS) and (ii) the synchronization signal/physical broadcast control channel (SS/PBCH) block, or SSB for short. FIGS. 3A-3D show an example where CSI-RS is used to find an appropriate beam pair link (BPL), meaning a suitable gNB transmit spatial filtering configuration (gNB Tx beam) plus a suitable UE receive spatial filtering configuration (UE Rx beam) resulting in sufficiently good link budget. FIG. 3A shows a gNB Tx beam sweep during a beam training phase, FIG. 3B shows a UE Rx beam sweep during the beam training phase, and FIGS. 3C and 3D show downlink and uplink data transmission phases, respectively.

In the example, the beam training phase shown in FIGS. 3A and 3B is followed by the data transmission phase in FIGS. 3C and 3D. During the gNB Tx beam sweep shown in FIG. 3A, the TRP 104 (e.g., gNB) configures the UE 102 to measure on a set of five CSI-RS resources RS1-RS5. The TRP 104 transmits each of the CSI-RS resources RS1-RS5 with a different spatial filtering configuration. That is, the five CSI-RS resources RS1-RS5 are five different Tx beams. The UE 102 is also configured to report back the RS identification (ID) and the reference-signal receive power (RSRP) of the CSI-RS resource corresponding to the maximum measured RSRP. Hence, the RS ID corresponds to a beam, or a certain spatial filter configuration, at the TRP 104.

In the example shown in FIGS. 3A-3D, the UE 102 determined the RS4 as having the maximum measured RSRP. The TRP 104 receives the report from the UE 102 and learns that RS4 is the preferred Tx beam from the UE perspective. Typically, TRP 104 selects the spatial transmission configuration that was used to transmit the preferred Tx beam from the UE perspective (i.e., RS4 in this example) for future transmissions to the UE 102. As shown in FIG. 3B, to assist the UE 102 in finding a good RX beam, the TRP 104 may perform a subsequent UE Rx beam sweep in which the TRP 104 again transmits a number of CSI-RS resources in different orthogonal frequency division multiplexing (OFDM) symbols but with all CSI-RS resources having the same spatial filtering configuration (i.e., the selected spatial filtering configuration), which in this example is the spatial transmission configuration that was used to transmit RS4 during the gNB Tx beam sweep shown in FIG. 3A.

As shown in FIG. 3B, as the TRP 104 performs a repetition of the same Tx beam, the UE 102 then tests a different Rx spatial filtering configuration (Rx beam) in each OFDM symbol in order to find the RX spatial filter configuration that maximize the received RSRP. In the example, the UE 102 determined RS6 as having the maximum measured RSRP. The UE 102 stores the RS ID of the RX spatial filter configuration that maximize the received RSRP (RS6 in this example) and the preferred RX spatial filter configuration that results in the largest RSRP. The network can then refer to this RS ID in the future when DL data is scheduled to the UE 102, thus allowing the UE 102 to adjust its Rx spatial filtering configuration (Rx beam) to receive the downlink data transmission (PDSCH). As mentioned above, any RS ID (RS6 in this example) is contained in a transmission configuration indicator (TCI) that is carried in a field in the downlink control information (DCI) that schedules the PDSCH. Hence, that TCI states will be used by the TRP 104 when scheduling PDSCH in subsequent slots and until new beam management measurements finds a better set of TX and RX beams. That is, for downlink data/control transmission shown in FIG. 3C, the TRP 104 (e.g., gNB) indicates to the UE 102 that the Physical Downlink Control Channel (PDCCH)/PDSCH Demodulation Reference Signal (DMRS) (i.e., PDCCH/PDSCH DMRS) is spatially quasi-co-located (QCL) with RS6. At least for the Physical Uplink Control Channel (PUCCH) transmission shown in FIG. 3D, the TRP 104 indicates to the UE 102 that RS6 is the spatial relation for the Physical Uplink Control Channel (PUCCH).

Spatial QCL Definition

In NR, the term "spatial quasi-co-location" has been adopted and applies to a relationship between the antenna port(s) of two different DL reference signals (RSs). If two transmitted DL RSs are spatially QCL'd at the UE receiver, then the UE 102 may assume that the first and second RSs are transmitted with approximately the same Tx spatial filter configuration. Thus, the UE 102 may use approximately the same Rx spatial filter configuration to receive the second reference signal as it used to receive the first reference signal. In this way, spatial QCL basically introduces a "memory," is a term that assists in the use of analog beamforming, and formalizes the notion of "same UE Rx beam" over different time instances.

Referring to the downlink data transmission phase illustrated in FIG. 3C, the TRP 104 (e.g., gNB) indicates to the UE 102 that the PDSCH DMRS is spatially QCL'd with RS6. This means that the UE may use the same Rx spatial filtering configuration (Rx beam) to receive the PDSCH as the preferred spatial filtering configuration (Rx beam) determined based on RS6 during the UE beam sweep in the DL beam management phase (see FIG. 3B).

Spatial Relation Definition

While spatial QCL refers to a relationship between two different DL RSs from a UE perspective, NR has also adopted the term "spatial relation" to refer to a relationship between an UL RS (e.g., sounding reference signal (SRS) or PUCCH/PUSCH DMRS) and another RS, which can be either a DL RS (e.g., CSI-RS or SSB) or an UL RS (e.g., SRS). This is also defined from a UE perspective. If the UL RS is spatially related to a DL RS, it means that the UE 102 should transmit the UL RS in the opposite direction from which it received the second RS previously. More precisely, the UE 102 should apply the "same" Tx spatial filtering configuration for the transmission of the first RS as the Rx spatial filtering configuration it previously used to receive the second RS. If the second RS is an uplink RS, then the UE 102 should apply the same Tx spatial filtering configuration for the transmission of the first RS as the Tx spatial filtering configuration it used to transmit the second RS previously.

Referring to the uplink data transmission phase illustrated in FIG. 3D, the TRP 104 (e.g., gNB) indicates to the UE 102 that the PUCCH DMRS is spatially related to RS6. This means that the UE should use the "same" Tx spatial filtering configuration (Tx beam) to transmit the PUCCH as the preferred Rx spatial filtering configuration (Rx beam) the UE 102 previously determined based on RS6 during the UE beam sweep in the DL beam management phase shown in FIG. 3B.

Using DL RSs as the source RS in a spatial relation is very effective when the UE 102 has the capability in hardware and software implementation to transmit the UL signal in the same (or one can also see this as "opposite direction" since this is a transmission instead of a reception) direction from which it previously received the DL RS. In other words, using DL RSs as the source RS in a spatial relation is very effective if the UE 102 can achieve the same Tx antenna gain during transmission as the antenna gain it achieved during reception. This capability (known as beam correspondence) will not always be perfect. For example, due to imperfect calibration, the UL Tx beam may point in another direction and result in a loss in UL coverage. To improve the performance in this situation, UL beam management based on SRS sweeping (instead of using a DL RS can be used), as shown in FIGS. 4A-4C.

The signaling of the preferred SRS resource as the source of the spatial relation can be performed using different signaling methods (e.g., radio resource control (RRC), medium access control channel element (MAC CE) or downlink control information (DCI)) depending on which channel is pointed to.

To achieve optimum performance, the procedure depicted in FIGS. 4A-4C to update the source RS for a spatial relation should be repeated as soon as the Tx beam of the UE 102 changes or if the UE 102 rotates.

The scheduling assignment that triggers the uplink data transmission (PUSCH) in the third step shown in FIG. 4C points to the most recent transmission of the indicated SRS resource. For every subsequent scheduling assignment, the UE 102 is required to use the Tx beam used for the corresponding SRS transmission.

FIGS. 4A-4C illustrate uplink (UL) beam management using an SRS sweep. As shown in FIG. 4A, in the first step, the UE 102 transmits a series of UL signals (SRS resources), using different Tx beams. The TRP 104 (e.g., gNB) then performs measurements for each of the SRS transmissions, and determines which SRS transmission was received with the best quality, or highest signal quality. As shown in FIG. 4B, the TRP 104 then signals the preferred SRS resource to the UE 102. As shown in FIG. 4C, the UE subsequently transmits the PUSCH in the same beam where it transmitted the preferred SRS resource.

CSI Frame Work in NR

For channel state information (CSI) feedback, NR has adopted an implicit CSI mechanism where a UE 102 feeds back the downlink channel state information, which typically includes a transmission rank indicator (RI), a precoder matrix indicator (PMI), and channel quality indicator (CQI) for each codeword. The CQI/RI/PMI report can be either wideband or subband based on configuration.

The RI corresponds to a recommended number of layers that are to be spatially multiplexed and thus transmitted in parallel over the effective channel. The PMI identifies a recommended precoding matrix to use. The CQI represents a recommended modulation level (e.g., quadrature phase shift keying (QPSK), 16 quadrature amplitude modulation (16QAM), etc.) and coding rate for each codeword or TB. NR supports transmission of one or two codewords to a UE 102 in a slot where two codewords are used for 5 to 8 layer transmission and one codeword is used for 1 to 4 layer transmission. There is thus a relation between a CQI and an signal-to-interference-plus-noise ratio (SINR) of the spatial layers over which the codewords are transmitted, and, for two codewords, there are two CQI values fed back.

Channel State Information Reference Signals (CSI-RS)

For CSI measurement and feedback, dedicated CSI reference signals (CSI-RS) are defined. A CSI-RS resource consist of between 1 and 32 CSI-RS ports, and each port is typically transmitted on each transmit antenna (or virtual transmit antenna in case the port is precoded and mapped to multiple transmit antennas) and is used by a UE 102 to measure downlink channel between each of the transmit antenna ports and each of its receive antenna ports. The antenna ports are also referred to as CSI-RS ports. The supported number of antenna ports in NR are 1, 2, 4, 8, 12, 16, 24, and 32. By measuring the received CSI-RS, a UE 102 can estimate the channel that the CSI-RS is traversing, including the radio propagation channel, potential precoding or beamforming, and antenna gains. The CSI-RS for the above purpose is also referred to as Non-Zero Power (NZP) CSI-RS, but there are also zero power (ZP) CSI-RS used for purposes other than coherent channel measurements.

CSI-RS can be configured to be transmitted in certain resource elements (REs) in a slot and certain slots. FIG. 5 shows an example of a CSI-RS resource mapped to REs for 12 antenna ports, where 1RE per resource block (RB) per port is shown.

In addition, interference measurement resource for CSI feedback (CSI-IM) is also defined in NR for a UE 102 to measure interference. A CSI-IM resource contains 4 REs, either 4 adjacent REs in frequency in the same OFDM symbol or 2 by 2 adjacent REs in both time and frequency in a slot. By measuring both the channel based on NZP CSI-RS and the interference based on CSI-IM, a UE 102 can estimate the effective channel and noise plus interference to determine the CSI (e.g., rank, precoding matrix, and the channel quality). Furthermore, a UE 102 in NR may be configured to measure interference based on one or multiple NZP CSI-RS resources.

CSI Framework in NR

In NR, a UE 102 can be configured with multiple CSI reporting settings (with higher layer parameter CSI-ReportConfig) and multiple CSI resource settings (with higher layer parameter CSI-ResourceConfig). Each CSI resource setting has an associated identifier (higher layer parameter CSI-ResourceConfigId) and contains a list of S>1 CSI Resource Sets (given by higher layer parameter csi-RS-ResourceSetList), where the list includes references to NZP CSI-RS resource set(s) or the list includes references to CSI-IM resource set(s). For periodic and semi-persistent CSI Resource Settings, the number of CSI Resource Sets configured is limited to S=1.

For aperiodic CSI reporting, a list of CSI trigger states is configured using the higher layer parameter CSI-AperiodicTriggerStateList. Each trigger state contains at least one CSI report setting. For aperiodic CSI Resource Setting with S>1 CSI resource sets, only one of the aperiodic CSI resource sets is associated with a CSI trigger state, and the UE 102 is higher layer configured per trigger state per Resource Setting to select the one CSI-IM or NZP CSI-RS resource set from the Resource Setting. Downlink control information (DCI) is used to select a CSI trigger state dynamically.

Each CSI reporting setting contains the following information: (i) a CSI resource setting on NZP CSI-RS resources for channel measurement, (ii) a CSI resource setting for CSI-IM resources for interference measurement, (iii) optionally, a CSI resource setting for NZP CSI-RS resources for interference measurement, (iv) time-domain behavior for reporting (e.g., periodic, semi-persistent, or aperiodic reporting), (v) frequency granularity (e.g., wideband or subband CQI and PMI respectively), (vi) report quantity, i.e. CSI parameters to be reported such as RI, PMI, CQI, layer indicator (LI) and CSI resource indicator (CRI) in case of multiple NZP CSI-RS resources in a resource set, (vii) codebook types (e.g., type I or II if reported, and codebook subset restriction), and (viii) measurement restriction.

When $K_s>1$ NZP CSI-RS resources are configured in the corresponding NZP CSI-RS resource set for channel measurement, one of the $K_s>1$ NZP CSI-RS resources is selected by the UE 102, and a NZP CSI-RS resource indicator (CRI) is reported by the UE 102 to indicate to the TRP 104 (e.g., gNB) about the selected NZP CSI-RS resource in the resource set. The UE 102 derives the other CSI parameters (i.e., RI, PMI and CQI) conditioned on the reported CRI, where CRI k (k>0) corresponds to the configured (k+1)-th entry of associated NZP CSI-RS Resource in the corresponding NZP CSI-RS ResourceSet for channel measurement, and (k+1)-th entry of associated CSI-IM Resource in the corresponding CSI-IM-ResourceSet for interference measurement. The CSI-IM-ResourceSet, if configured, has also $K_s>1$ resources.

point of the DCI field "CSI request" to a UE 102, where each codepoint is associated with one of the pre-configured aperiodic trigger states. Upon reception of the value associated with a trigger state, the UE 102 will perform measurement of the CSI-RSs defined in resourceSet (and if indicated, the CSI-RS(s) defined in csi-IM-ResourcesForInterference or nzp-CSI-RS-ResourcesForInterference) and aperiodic reporting on layer 1 (L1) according to all entries in the associatedReportConfigInfoList for that trigger state. The CSI-AperiodicTriggerStateList information element is configured using RRC signaling and shown below.

CSI-AperiodicTriggerStateList Information Element

```
-- ASN1 START
-- TAG-CSI-APERIODICTRIGGERSTATELIST-START
CSI-AperiodicTriggerStateList ::=    SEQUENCE (SIZE (1..maxNrOfCSI-AperiodicTriggers))
OF CSI-AperiodicTriggerState
CSI-AperiodicTriggerState ::=        SEQUENCE {
   associatedReportConfigInfoList    SEQUENCE
(SIZE(1..maxNrofReportConfigPerAperiodicTrigger)) OF CSI-AssociatedReportConfigInfo,
   ...
}
CSI-AssociatedReportConfigInfo ::=   SEQUENCE {
   reportConfigId                    CSI-ReportConfigId,
   resourcesForChannel               CHOICE {
      nzp-CSI-RS                     SEQUENCE {
         resourceSet                 INTEGER (1..maxNrofNZP-CSI-RS-
ResourceSetsPerConfig),
         qcl-info                    SEQUENCE (SIZE(1..maxNrofAP-CSI-RS-ResourcesPer-
Set))
OF TCI-StateId OPTIONAL              -- Cond Aperiodic
      },
      csi-SSB-ResourceSet            INTEGER (1..maxNrofCSI-SSB-ResourceSetsPerCon-
fig)
   },
   csi-IM-ResourcesForInterference    INTEGER(L.maxNrofCSI-IM-ResourceSetsPerConfig)
OPTIONAL, -- Cond CSI-IM-ForInterference
   nzp-CSI-RS-ResourcesForInterference  INTEGER (L.maxNrofNZP-CSI-RS-
ResourceSetsPerConfig)                OPTIONAL, -- Cond NZP-CSI-RS-ForInterference
   ...
}
-- TAG-CSI-APERIODICTRIGGERSTATELIST-STOP
```

Aperiodic CSI-RS

For aperiodic CSI reporting in NR, more than one CSI reporting setting with different NZP CSI-RS resource settings for channel measurement and/or CSI-IM resource settings for interference measurement can be configured within a single CSI trigger state and triggered at the same time with a DCI. In this case, multiple CSI reports, each associated with on CSI report setting, are aggregated and sent from the UE 102 to the TRP 104 (e.g., gNB) in a single PUSCH. Each CSI trigger state can include up to 16 CSI reporting settings in NR. A 3 bit CSI request field in an uplink DCI (e.g., DCI format 0-1) is used to select one of the trigger states for CSI reporting. When the number of radio resource control (RRC) configured CSI trigger states are more than 7, MAC control element (CE) is used to select 7 active trigger states out of the RRC configured trigger states.

Beam management is expected to be based decidedly on aperiodic CSI-RS transmissions because it allows the beam management procedures to be triggered on a per need basis, which facilitate a low overhead consumption.

An aperiodic CSI-RS transmission is triggered by the network by first pre-configuring the UE 102 with a list of aperiodic trigger states in CSI-AperiodicTriggerStateList information element, and, then, whenever a CSI-RS transmission should be carried out, the network signals a code- As shown above, one of the parameters in an aperiodic trigger state is the qcl-info, which contains a list of references to TCI-States for providing the QCL source and QCL type for each NZP-CSI-RS-Resource listed in the NZP-CSI-RS-ResourceSet indicated by nzp-CSI-RS-ResourcesforChannel. For mmWave frequencies, it is expected that the TCI-states indicated in qcl-info contains a spatial QCL reference, and, hence, indicates to the UE 102 which Rx spatial filtering configuration (i.e., UE RX beam) the UE 102 is to use to receive the aperiodic CSI-RS resources.

MU-MIMO

Multi-user, multiple-input, multiple-output (MU-MIMO) is expected to be a key technical component in 5G. The purpose of MU-MIMO is to enable multiple UE transmissions simultaneously using the same or overlapping time, frequency, and code resource (if any) and, in this way, increase the capacity of the system. If the TRP 104 (e.g., 5G base station (a.k.a., gNB)) has multiple panels, it can perform MU-MIMO transmission by, for example, transmitting to one UE from each panel. Significant capacity gains can be achieved with MU-MIMO if there is low interference between co-scheduled UEs. Low interference can be achieved by making accurate CSI available at the transmitter to facilitate interference nulling in the precoding (mainly applicable for digital arrays) and/or by co-scheduling UEs that have close to orthogonal channels. An example of the latter is if two UEs are in line-of-sight and have an angular separation larger than the beamwidth of the panels. In this case, the two UEs can be co-scheduled by transmitting with a first beam directed to the first UE from a first panel and transmitting with a second beam directed to the second UE from a second panel.

MU-MIMO with Rel-15 Beam Management Framework

To enable MU-MIMO for analog panels at the TRP 104, it is beneficial that the TRP 104 determines a TRP TX beam for respective UEs 102 which keeps the inter-UE interference low while maintaining a strong signal for each UE 102. In this way, high SIR (or SINR) can be attained for both UEs 102.

One method to select a suitable TRP TX beam using the release 15 (Rel-15) beam management framework is illustrated in FIG. 6A. In FIG. 6A, the TRP 104 has determined two UEs 102a and 102b that it would like to co-schedule in the DL direction. Therefore, the TRP 104 would like to find suitable TRP TX beams for both UEs 102a and 102b.

In a first step, the TRP 104 performs a TRP TX beam sweep A, which means that the TRP 104 transmits CSI-RS resources using a set 601 of four different TRP TX beams roughly pointing in a direction towards UE 102a (the approximate direction of each UE can be obtained for example based on UE reports of the strongest Synchronization Signal Block (SSB) beam). Both UEs 102a and 102b are triggered to perform RSRP measurements on the CSI-RS resources of TRP TX beam sweep A and report the RSRP for each respective TRP TX beam. Here, the RSRP should preferably be as high as possible for UE 102a and as low as possible for UE 102b (because it will be considered as interference for UE 102b) in order to maximize the MU-MIMO performance.

In the second step, the same thing is done again, except that a new set of TRP TX beams 603 are use during the CSI-RS transmission, where the new set 603 of TRP TX beams point roughly in the direction of UE 102b. Again, both UEs 102a and 102b report RSRP for all four TRP TX beams. The TRP 104 now has access to received signal strength for both UEs 102a and 102b from all 8 TRP TX beams.

In a third step, the TRP 104 evaluates the SIR for all 16 different combinations of TRP TX beam pairs (where each combination consists of one TRP TX beam from beam sweep A to be used for transmission to UE 102a and one TRP TX beam from beam sweep B to be used for transmission to UE 102b). The TRP 104 can then select the TRP TX beam combination that, for example, maximizes the average SIR over both UEs 102a and 102b, as shown in FIG. 6B.

UE Implementation at mmWave

For UEs 102, the incoming signals can arrive from any direction, hence it is beneficial and typical to have an antenna implementation at the UE 102 having the possibility to generate omni-directional-like coverage in addition to the high gain narrow beams. Still, array gain is crucial for coverage, hence panels of antenna arrays are typically used. One way to increase the omni-directional coverage at a UE 102 is then to install multiple panels and point the panels in different directions. FIG. 7 illustrates a UE 702 having multiple panels pointed in different directions.

SUMMARY

Certain challenges presently exist. For example, with a downlink beam management solution based on 3GPP NR Rel-15 it is difficult to determine if two UEs can be co-scheduled (e.g., served by the TRP using the same time and frequency resources as well as code resources, if any).

Some embodiments of the invention overcome this problem using beam reporting that takes into account MU-MIMO scheduling by triggering both a set of NZP CSI-RS resources for channel measurement as well as a set of NZP CSI-RS resources for interference measurement. With this configuration, it may be possible to attain more reliable information about (i) whether or not two UEs can be scheduled for MU-MIMO (including in a scattering environment) and/or (ii) which TRP TX beam that would be most suitable for MU-MIMO transmission. In some embodiments, the UE (or each UE) may determine and use an RX spatial filter configuration when calculating the RSRP from the CSI-RSs used for channel measurements as when calculating the interference from the CSI-RS used for interference measurements. In some embodiments, using the Rx spatial filter configuration may prevent the TRP from not knowing whether the reports of RSRP and interference will be applicable during the actual MU-MIMO transmission.

In some embodiments, the different TRP TX beams used during the beam sweep might have different spatial QCL, and the TRP may inform the UE about the different spatial QCL in the different TRP TX beams. In some non-limiting embodiments, to make sure that a suitable RX spatial filter is used for both channel and interference measurements of each TRP TX beam, a new CSI-AperiodicTriggerStateList may indicate which spatial QCL assumption the UE should apply for each TRP TX beam when receiving the CSI-RS resource for both channel measurements and interference measurements. In some embodiments, the UE may determine a suitable RX spatial filter based on the spatial QCL assumption indications for the TRP TX beams.

In one aspect, a method performed by a user equipment (UE) is provided. The method may include determining a receive (RX) spatial filter for receiving both a first measurement resource and a second measurement resource. The RX spatial filter may be determined based on a first spatial quasi-co-located (QCL) reference associated with the first measurement resource and a second spatial QCL reference associated with the second measurement resource. The first and second spatial QCL references may be different. The method may include measuring the first and second measurement resources with the determined Rx filter configuration.

In some embodiments, the method may further include obtaining the first spatial QCL reference associated with the first measurement resource and the second spatial QCL reference associated with the second measurement resource. In some embodiments, the method may further include generating a report based on the measurement of the MR and signal the report to a transmit receive point (TRP).

In some embodiments, determining the RX spatial filter may include adding complex antenna weights for a first narrow beam associated with the first QCL reference and complex antenna weights for a second narrow beam associated with the second QCL reference. In some embodiments, determining the RX spatial filter may include evaluating different phase settings and designing a radiation pattern that has high gain in both a direction of a first narrow beam associated with the first QCL reference and a direction of a second narrow beam associated with the second QCL reference. In some embodiments, determining the RX spatial filter may include using dual-polarized beamforming to find complex antenna weights for the RX spatial filter. In some embodiments, the determined RX spatial filter may generate a wide beam from an antenna panel of the UE, and the wide beam enables the UE to receive signals from directions indicated by the first and second spatial QCL references.

In some embodiments, the determined RX spatial filter may include a first RX spatial filter for a first antenna panel of the UE to receive signals from a direction indicated by the first spatial QCL reference and a second RX spatial filter for a second antenna panel of the UE to receive signals from a direction indicated by the second spatial QCL reference, and the first and second antenna panels may be separate and distinct antenna panels. In some embodiments, the first RX spatial filter for the first antenna panel may be determined based on the first spatial QCL reference and may be not determined based on the second spatial QCL reference, and the second RX spatial filter for the second antenna panel may be determined based on the second spatial QCL reference and is not determined based on the first spatial QCL reference. In some embodiments, measuring the first and second measurement resources with the determined Rx filter configuration may include: measuring the first measurement resource with the first RX spatial filter; and measuring the second measurement resource with the second RX spatial filter.

In some embodiments, the first and second measurement resources may be channel state information reference signals (CSI-RSs). In some embodiments, the CSI-RSs may be non-zero power (NZP) CSI-RSs. In some embodiments, the measurements of the first and second measurement resources may be channel measurements.

In some embodiments, the method may further include measuring a third measurement resource with the determined Rx filter configuration. In some embodiments, the measurement of the third measurement resource may be an interference measurement. In some embodiments, the RX spatial filter may be not determined based on a third spatial QCL reference associated with the third measurement resource. In some embodiments, the method may further include receiving downlink control information (DCI) indicating a triggered aperiodic trigger state from a plurality of aperiodic trigger states, and the first, second, and third measurement resources may be triggered by the indicated triggered aperiodic trigger state.

In some embodiments, the method may further include receiving downlink control information (DCI) indicating a triggered aperiodic trigger state from a plurality of aperiodic trigger states, and the first and second measurement resources may be triggered by the indicated triggered aperiodic trigger state.

In some embodiments, the UE may be configured with a list of trigger states; each trigger state of the list of trigger states may include a first resource set including one or more measurement resources for channel measurements, a second resource set including one or more measurement resources for interference measurements, and one or more spatial QCL references associated with the one or more measurement resources for channel measurements; the list of trigger states may include a first trigger state; the first resource set of the first trigger state may include the first and second measurement resources; the first trigger state may include the first and second spatial QCL resources; and the method may further include receiving an indication of the first trigger state of the list of trigger states, which results in the RX spatial filter being determined based on the first spatial QCL reference associated with the first measurement resource and the second spatial QCL reference associated with the second measurement resource. In some embodiments, the one or more measurement resources for channel measurements of the first resource set of each trigger state of the list of trigger states and the one or more measurement resources for interference measurements of the second resource set of each trigger state of the list of trigger states may be channel state information reference signals (CSI-RSs). In some embodiments, the CSI-RSs may be non-zero power (NZP) CSI-RSs. In some embodiments, the list of trigger states may be a channel state information aperiodic trigger state list.

In another aspect a user equipment (UE) is provided. The UE may be adapted to determine a receive (RX) spatial filter for receiving both a first measurement resource and a second measurement resource. The RX spatial filter may be determined based on a first spatial quasi-co-located (QCL) reference associated with the first measurement resource and a second spatial QCL reference associated with the second measurement resource, and the first and second spatial QCL references may be different. The UE may be adapted to measure the first and second measurement resources with the determined Rx filter configuration.

In some embodiments, the UE may be further adapted to obtain the first spatial QCL reference associated with the first measurement resource and the second spatial QCL reference associated with the second measurement resource. In some embodiments, the UE may be further adapted to generate a report based on the measurement of the MR and signal the report to a transmit receive point (TRP).

In some embodiments, determining the RX spatial filter may include adding complex antenna weights for a first narrow beam associated with the first QCL reference and complex antenna weights for a second narrow beam associated with the second QCL reference. In some embodiments, determining the RX spatial filter may include evaluating different phase settings and designing a radiation pattern that has high gain in both a direction of a first narrow beam associated with the first QCL reference and a direction of a second narrow beam associated with the second QCL reference. In some embodiments, determining the RX spatial filter may include using dual-polarized beamforming to find complex antenna weights for the RX spatial filter. In some embodiments, the UE may include an antenna panel, the determined RX spatial filter may generate a wide beam from the antenna panel, and the wide beam may enable the UE to receive signals from directions indicated by the first second spatial QCL references.

In some embodiments, the UE may include a first antenna panel and a second antenna panel that is separate and distinct from the first antenna panel, and the determined RX spatial filter may include a first RX spatial filter for the first antenna panel to receive signals from a direction indicated by the first spatial QCL reference and a second RX spatial filter for the second antenna panel to receive signals from a direction indicated by the second spatial QCL reference. In some embodiments, the first RX spatial filter for the first antenna panel may be determined based on the first spatial QCL reference and is not determined based on the second spatial QCL reference, and the second RX spatial filter for the second antenna panel may be determined based on the second spatial QCL reference and is not determined based on the first spatial QCL reference. In some embodiments, measuring the first and second measurement resources with the determined Rx filter configuration may include: measuring the first measurement resource with the first RX spatial filter; and measuring the second measurement resource with the second RX spatial filter.

In some embodiments, the first and second measurement resources may be channel state information reference signals (CSI-RSs). In some embodiments, the CSI-RSs may be non-zero power (NZP) CSI-RSs. In some embodiments, the measurements of the first and second measurement resources may be channel measurements.

In some embodiments, the method may further include measuring a third measurement resource with the determined Rx filter configuration. In some embodiments, the measurement of the third measurement resource may be an interference measurement. In some embodiments, the RX spatial filter may be not determined based on a third spatial QCL reference associated with the third measurement resource. In some embodiments, the UE may be further adapted to receive downlink control information (DCI) indicating a triggered aperiodic trigger state from a plurality of aperiodic trigger states, wherein the first, second, and third measurement resources are triggered by the indicated triggered aperiodic trigger state.

In some embodiments, the UE may be further adapted to receive downlink control information (DCI) indicating a triggered aperiodic trigger state from a plurality of aperiodic trigger states, and the first and second measurement resources are triggered by the indicated triggered aperiodic trigger state.

In some embodiments, the UE may be configured with a list of trigger states; each trigger state of the list of trigger states may include a first resource set including one or more measurement resources for channel measurements, a second resource set including one or more measurement resources for interference measurements, and one or more spatial QCL references associated with the one or more measurement resources for channel measurements; the list of trigger states may include a first trigger state; the first resource set of the first trigger state may include the first and second measurement resources; the first trigger state may include the first and second spatial QCL resources; and the UE may be further adapted to receive an indication of the first trigger state of the list of trigger states, which may result in the RX spatial filter being determined based on the first spatial QCL reference associated with the first measurement resource and the second spatial QCL reference associated with the second measurement resource. In some embodiments, the one or more measurement resources for channel measurements of the first resource set of each trigger state of the list of trigger states and the one or more measurement resources for interference measurements of the second resource set of each trigger state of the list of trigger states may be channel state information reference signals (CSI-RSs). In some embodiments, the CSI-RSs may be non-zero power (NZP) CSI-RSs. In some embodiments, the list of trigger states may be a channel state information aperiodic trigger state list.

In yet another aspect, a computer program including instructions for adapting an apparatus to perform any of the methods described above is provided. In still another aspect, a carrier containing the computer program is provided, and the carrier may be one of an electronic signal, optical signal, radio signal, or compute readable storage medium.

In another aspect, a user equipment (UE) is provided. The UE may include a determining module and a measuring module. The determining module may be for determining a receive (RX) spatial filter for receiving both a first measurement resource and a second measurement resource. The RX spatial filter may be determined based on a first spatial quasi-co-located (QCL) reference associated with the first measurement resource and a second spatial QCL reference associated with the second measurement resource, and the first and second spatial QCL references may be different. The measuring module may be for measuring the first and second measurement resources with the determined Rx filter configuration.

An advantage of the above described embodiment is that the network performance is improved because the TRP can make more reliable decision when co-scheduling UEs (e.g., co-scheduling UEs for MU-MIMO transmissions).

BRIEF DESCRIPTION OF THE DRAWINGS

The accompanying drawings, which are incorporated herein and form part of the specification, illustrate various embodiments.

FIG. 2A illustrates an example of two two-dimensional dual-polarized panels.

FIG. 2B illustrates an example of two one-dimensional dual-polarized panels.

FIGS. 3A-3D illustrate an example where CSI-RS is used to find an appropriate beam pair link (BPL), meaning a suitable gNB transmit spatial filtering configuration (gNB Tx beam) plus a suitable UE receive spatial filtering configuration (UE Rx beam) resulting in sufficiently good link budget. FIG. 3A shows a gNB Tx beam sweep during a beam training phase, FIG. 3B shows a UE Rx beam sweep during the beam training phase, and FIGS. 3C and 3D show downlink and uplink data transmission phases, respectively.

DETAILED DESCRIPTION

Figure 1:
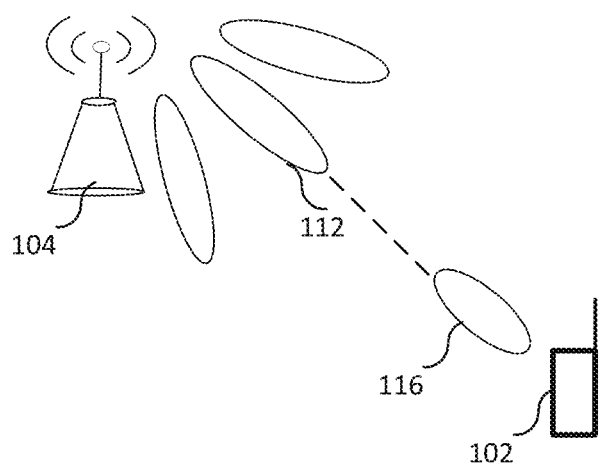
FIG. 1 illustrates a conventional beam-pair link (BPL).
Figure 4A:
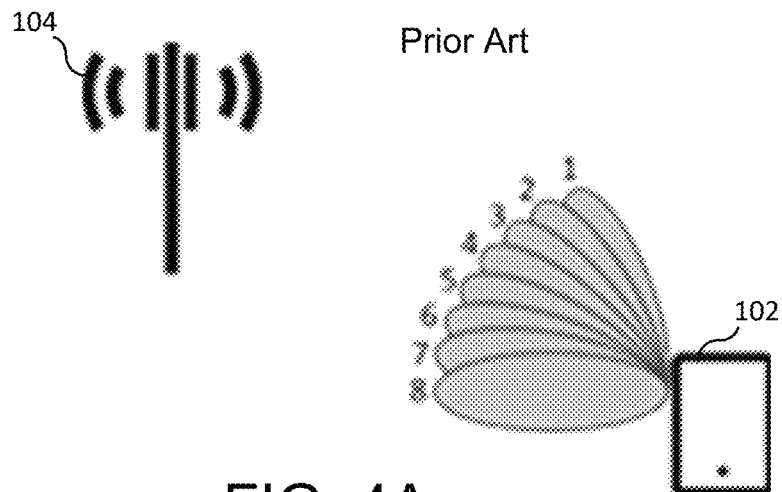
FIGS. 4A-4C illustrate uplink first through third steps, respectively, of (UL) beam management using an SRS sweep.
Figure 4B:
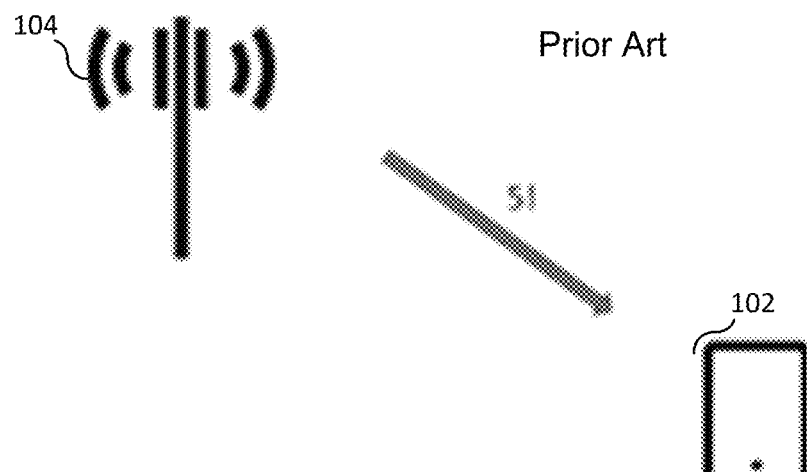
Figure 4C:
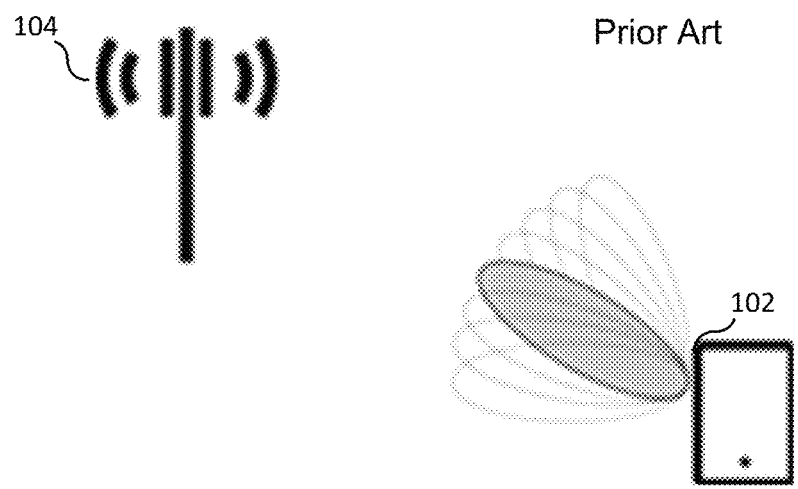
Figure 5:
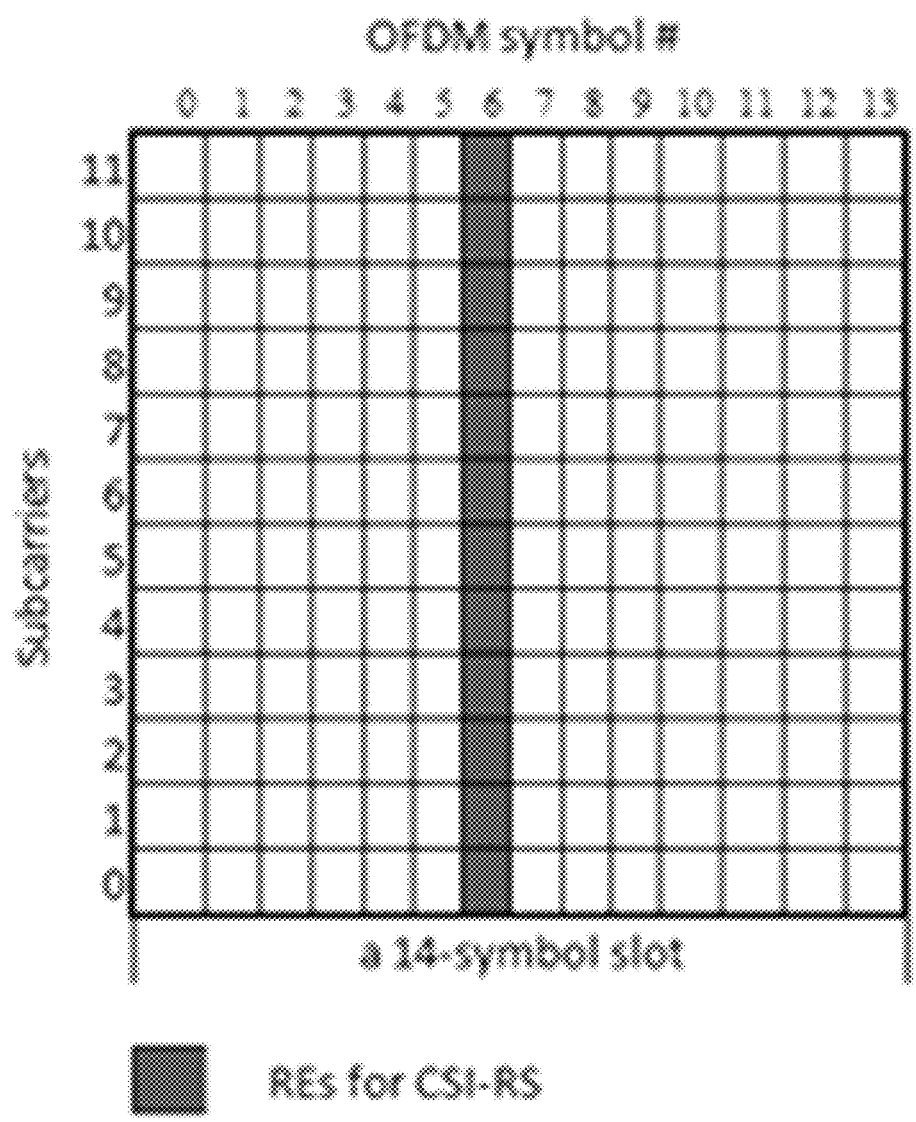
FIG. 5 illustrates an example of resource element (RE) allocation for a 12-port CSI-RS resource in NR.
Figure 6A:
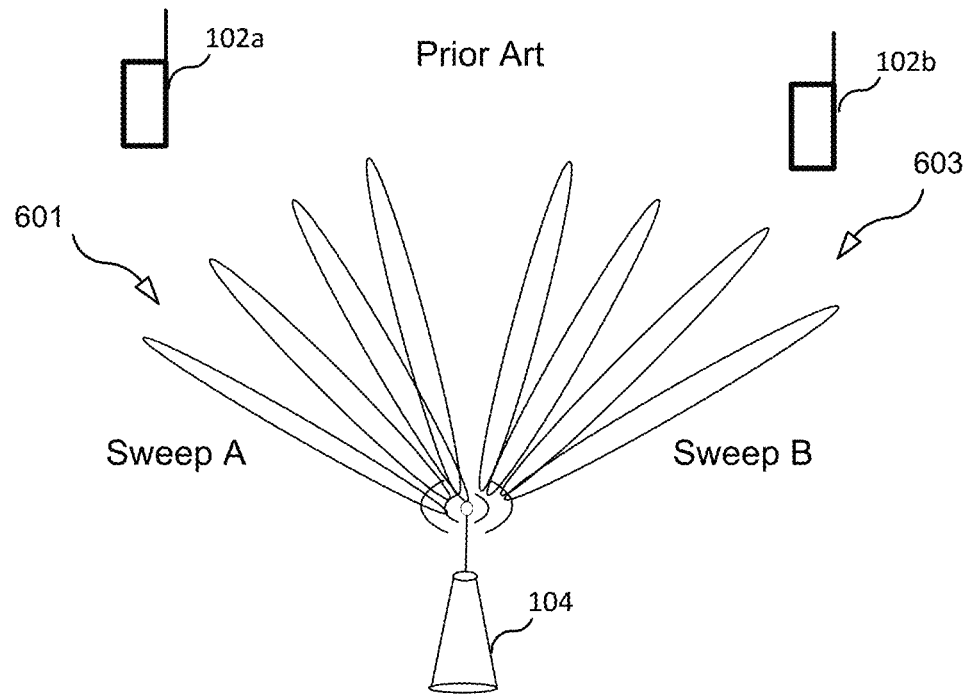
FIG. 6A illustrates one method to select a suitable TRP TX beam using the release 15 (Rel-15) beam management framework.
Figure 6B:
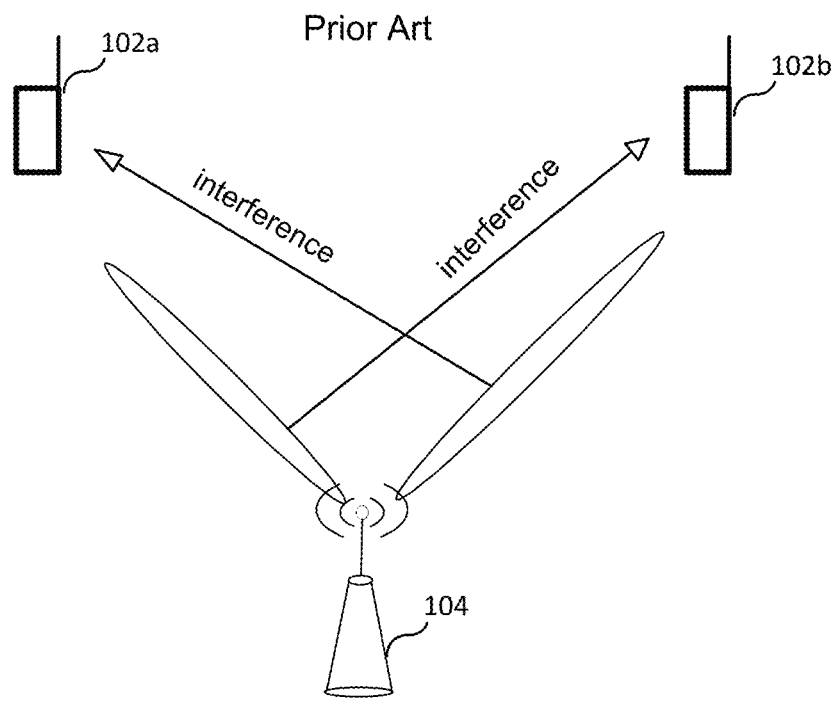
FIG. 6B illustrates a TRP using two TRP TX beams to communicate with two UEs simultaneously.
Figure 7:
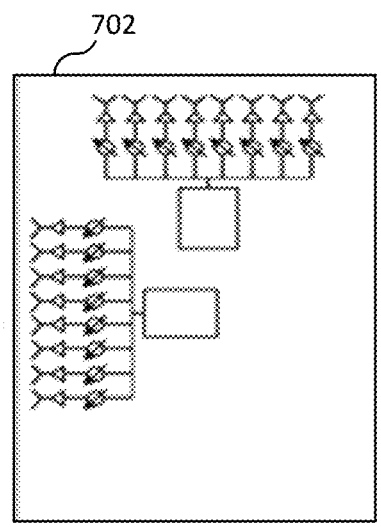
FIG. 7 illustrates a UE being equipped with at least two panels.
Figure 8:
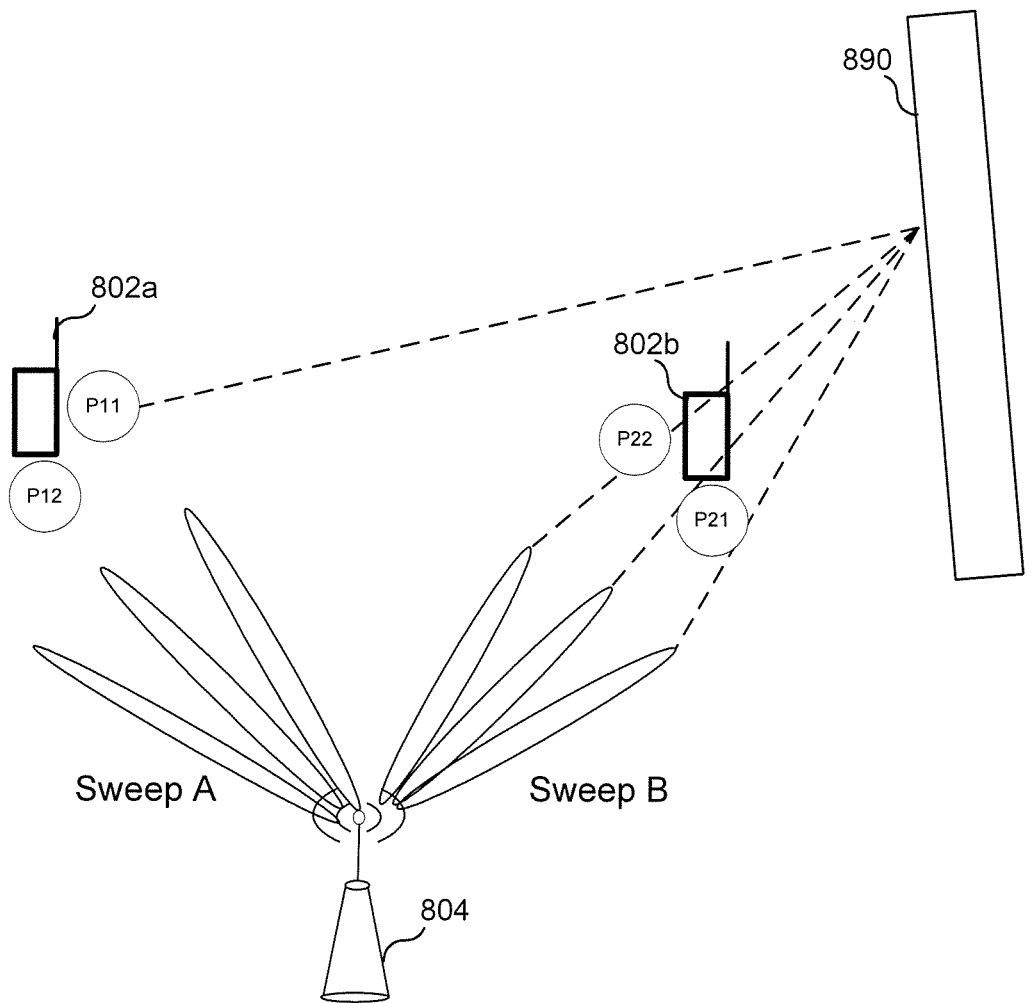
FIG. 8 illustrates a TRP performing two TRP TX beam sweeps (sweep A and sweep B).
Figure 9:
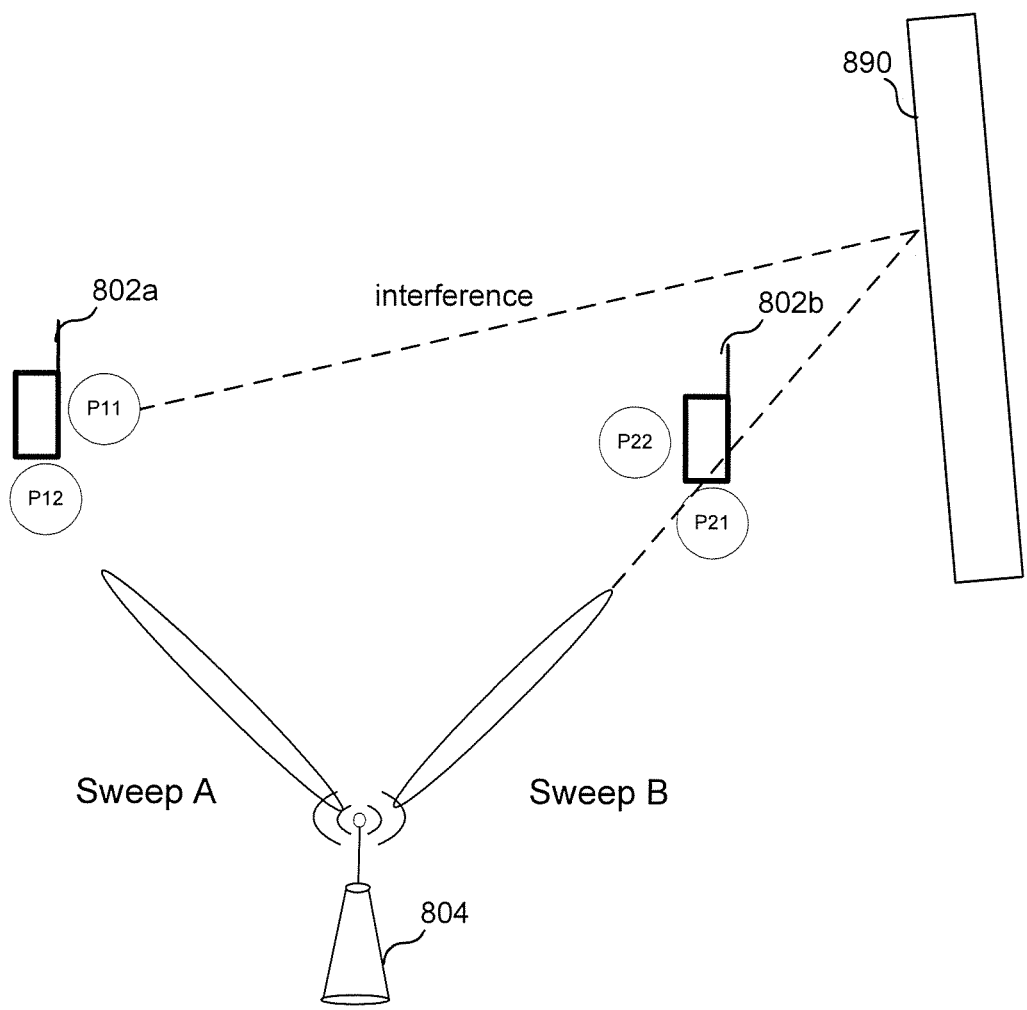
FIG. 9 illustrates a TRP using two TRP TX beams to communicate with two UEs simultaneously and further illustrates that one of the UEs experiences interference due to the communication between the TRP and the other UE.

FIGS. 8 and 9 illustrate an example of a problem associated with finding good scheduling candidates for MU-MIMO scheduling in an environment with scattering and with multi-panel UEs, as the integrity of the "beam" generally does not hold in such environment. In particular, FIGS. 8 and 9 illustrate an example of a problem associated with the Rel-15 downlink beam management solution for MU-MIMO described above. In this example, there are two UEs (UE 802a and UE 802b). Each of the UEs 802a and 802b has two antenna arrangements (e.g., panels P11 and P12 for UE 802a, and panels P21 and P22 for UE 802b). The antenna arrangements for each UE are pointing in different directions. As illustrated in FIG. 8, during the TRP TX beam sweep B, both UE 802a and UE 802b will report strong RSRP for all three TRP TX beams, because there is a reflection in a wall 890 that creates a strong path between the TRP TX beams in TRP TX beam sweep B and the panel P11 of UE 802a. This means that both UEs 802a and 802b will report strong RSRP values for all TRP TX beams in TRP TX beam sweep B. Hence, the TRP 804 will assume that it is not possible to co-schedule the two UEs 802a and 802b (e.g., not possible to schedule the two UEs 802a and 802b for MU-MIMO transmission).

However, as can be seen in FIG. 9, it would be possible to co-schedule the two UEs 802a and 802b because the best TRP TX beam from TRP TX beam sweep A will be received mainly with antenna/panel P12 of UE 702a, while the interference from the best TRP TX beam from TRP TX beam sweep B will be received mainly with antenna/panel P11 of UE 702a. Accordingly, it is easy for UE 702a to remove the interference and attain a good signal to inference measure (SIM) (e.g., good SIR or SINR) with just a simple interference rejection combining (IRC) receiver, which can be assumed to be available at UEs with multiple receiver antenna/panels (or, in a more simple case, by only receiving with the panel without the strong interference).

Thus, the example illustrated in FIGS. 8-9 shows that, with the Rel-15 downlink beam management MU-MIMO solution, it can be difficult to determine if two UEs can be co-scheduled, and determining the best TRP TX beams is difficult because it is not clear with which panels the UE are receiving the different TRP TX beams.

Some embodiments of the invention overcome this problem using beam reporting that takes into account MU-MIMO scheduling by triggering both a first set of measurement resources (e.g., NZP CSI-RS resources) for channel measurement as well as a second set of measurement resources (e.g., NZP CSI-RS resources) for interference measurement. With this configuration, it may be possible to attain more reliable information about (i) whether or not two UEs can be scheduled for MU-MIMO (including in a scattering environment) and/or (ii) which TRP TX beam that would be most suitable for MU-MIMO transmission. In some embodiments, the UE (or each UE) may determine and use an RX spatial filter configuration when calculating the RSRP from the CSI-RSs used for channel measurements as when calculating the interference from the CSI-RS used for interference measurements. In some embodiments, using the Rx spatial filter configuration may prevent the TRP from not knowing whether the reports of RSRP and interference will be applicable during the actual MU-MIMO transmission.

In some embodiments, the different TRP TX beams used during the beam sweep might have different spatial QCL, and the TRP may inform the UE about the different spatial QCL in the different TRP TX beams. In some non-limiting embodiments, to make sure that a suitable RX spatial filter is used for both channel and interference measurements of each TRP TX beam, a new CSI-AperiodicTriggerStateList may indicate which spatial QCL assumption the UE should apply for each TRP TX beam when receiving the CSI-RS resource for both channel measurements and interference measurements. In some embodiments, the UE may determine a suitable RX spatial filter based on the spatial QCL assumption indications for the TRP TX beams.

Figure 10:
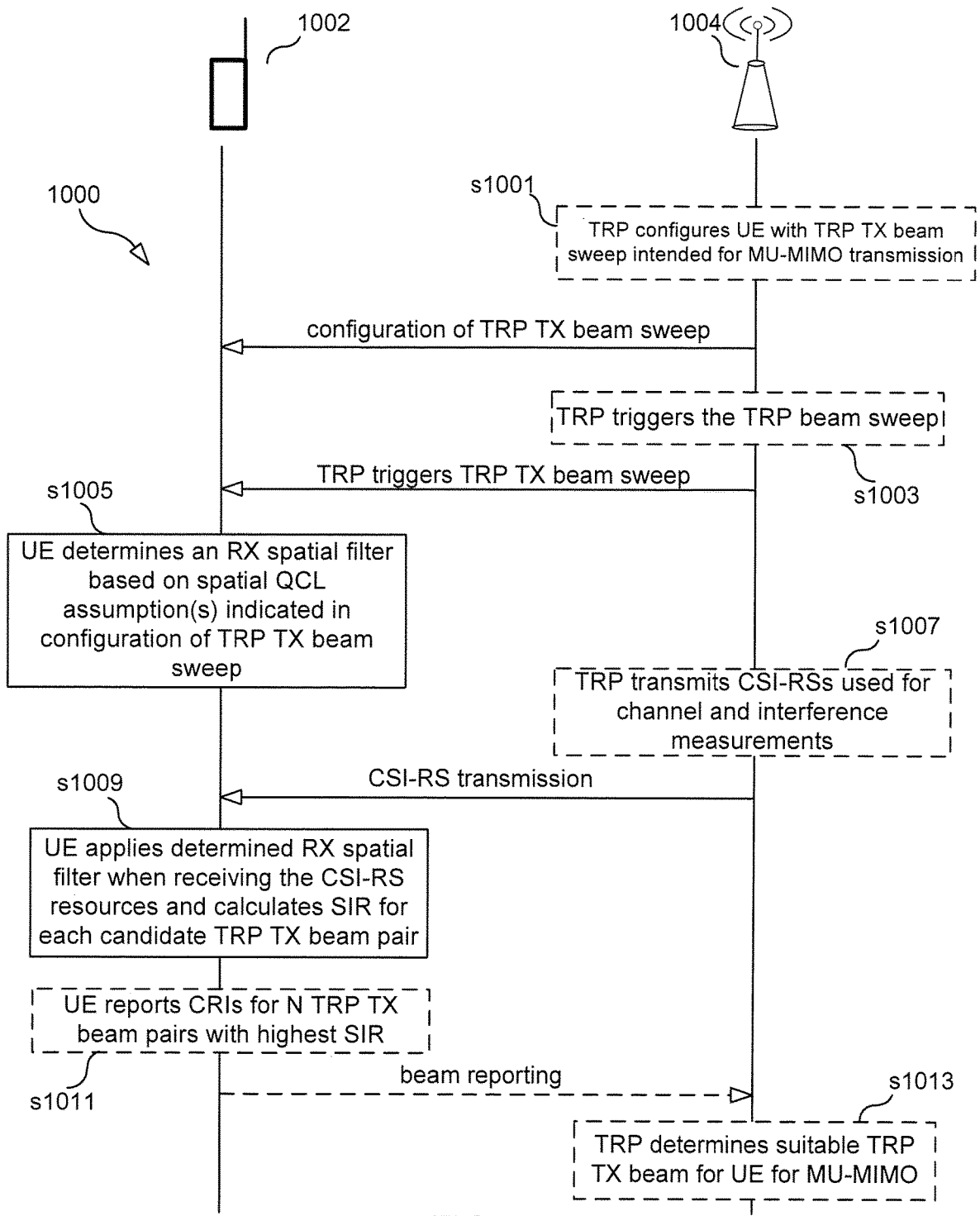
FIG. 10 illustrates a process performed by a TRP and a UE according to some non-limiting embodiments.

FIG. 10 illustrates a process 1000 performed by a TRP 1004 and a UE 1002 according to some non-limiting embodiments. Although the process 1000 is illustrated in FIG. 10 for one UE 1002 and one TRP 1004, the process 1000 may be performed simultaneously for multiple UEs, which may maximize the benefit for MU-MIMO scheduling. In some embodiments, one or more of the steps of the process 1000 shown in FIG. 10 with dashed lines may be optional steps.

In some embodiments, the process 1000 may include a step s1001 in which the TRP 1004 configures the UE 1002 with a TRP TX beam sweep intended for MU-MIMO. In some non-limiting embodiments, in step s1001, the TRP 1004 may convey a configuration for the TRP TX beam sweep to the UE 1002. In some embodiments, the configuration of the TRP TX beam sweep may be conveyed to the EU 1002 using signaling (e.g., RRC or MAC CE signaling). In some non-limiting embodiments, the TRP TX beam sweep may be configured in a CSI-AperiodicTriggerStateList. In some embodiments, the confirmation may include a trigger state that indicates at least two CSI-RS resource sets. In some embodiments, a first CSI-RS resource set may be used by the UE 1002 for channel measurements, and the second CSI-RS resource set may be used by the UE 1002 for interference measurements. In some embodiments, the confirmation may include one or more spatial QCL references, which may indicate to the UE 102 which Rx spatial filtering configuration(s) (i.e., UE RX beam(s)) the UE 102 is to use to receive the CSI-RS resources. In some embodiments, the CSI-RS resources may be aperiodic, semi-permanent, or periodic CSI-RS resources. In some embodiments, the CSI-RS resources may be or may include NZP CSI-RS resources. In some embodiments, the signaling (e.g., RRC signaling or MAC CE signaling) from the TRP 1004 to the UE 1002 may contain the configuration of two resource sets per trigger state. Configuring such a trigger state is already possible in NR Rel-15, but the NR Rel-15 trigger state cannot be used in conjunction with beam management.

In some embodiments, the process 1000 may include a step s1003 in which the TRP 1004 triggers the configured TRP TX beam sweep.

In some embodiments, the process 1000 may include a step s1005 in which the UE 1002 determines an RX spatial filtering configuration to be used when receiving the CSI-RS resources. In some embodiments, the UE 1002 may determine the RX spatial filtering configuration based on one or more spatial QCL references included in the configuration for the TRP TX beam sweep. In some embodiments, the one or more spatial QCL references may indicate to the UE 102 which Rx spatial filtering configuration(s) (i.e., UE RX beam(s)) the UE 102 is to use to receive the CSI-RS resources.

In some embodiments, if the CSI-RS resource set (e.g., NZP CSI-RS resource set) for channel measurements in the configuration for the TRP TX beam sweep has the same spatial QCL reference for all CSI-RS resources (e.g., NZP CSI-RS resources), in step s1005, the UE 1002 may determine an RX spatial filter based on that spatial QCL reference. In some embodiments, if two or more CSI-RS resources of the CSI-RS resource set for channel measurements in the configuration for the TRP TX beam sweep have different spatial QCL references, in step s1005, the UE 1002 may determine an RX spatial filter that can be used to receive signals from all the indicated spatial QCL references to receive all of the CSI-RS resources (e.g., NZP CSI-RS resources).

Figure 11A:
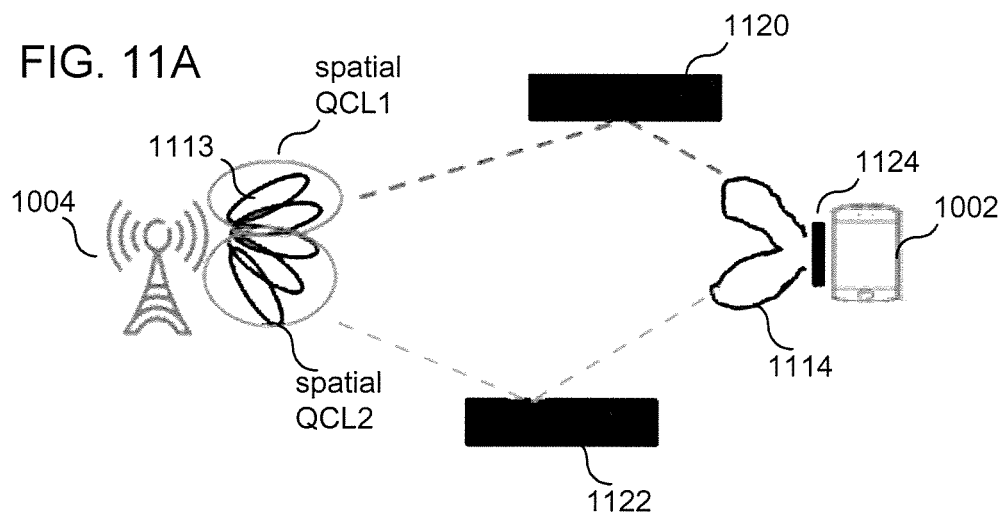
FIGS. 11A-11C illustrate three different embodiments for how the UE may determine a suitable RX spatial filter in the case where the CSI-RS resource set used for channel measurement contains CSI-RS resources with two different spatial QCL references.
Figure 11B:
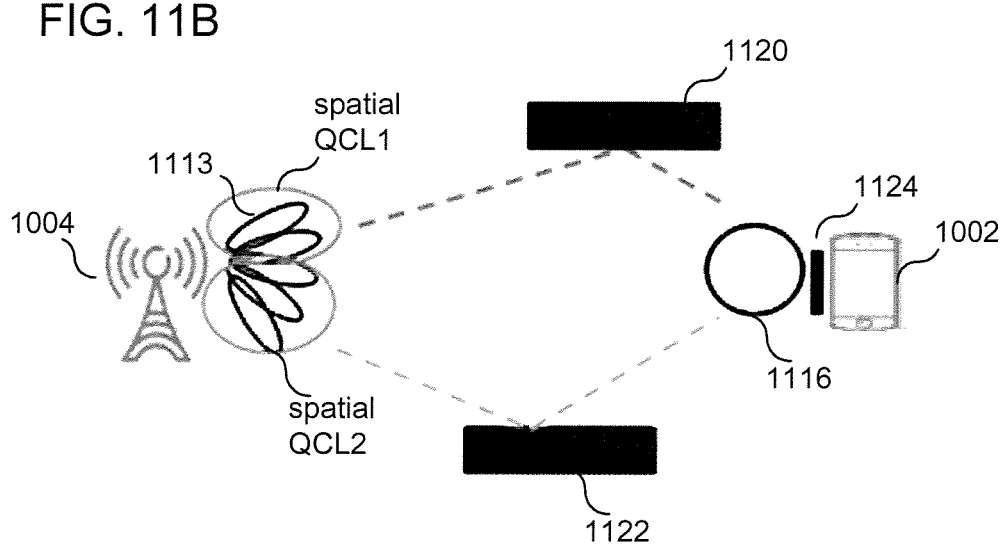
Figure 11C:
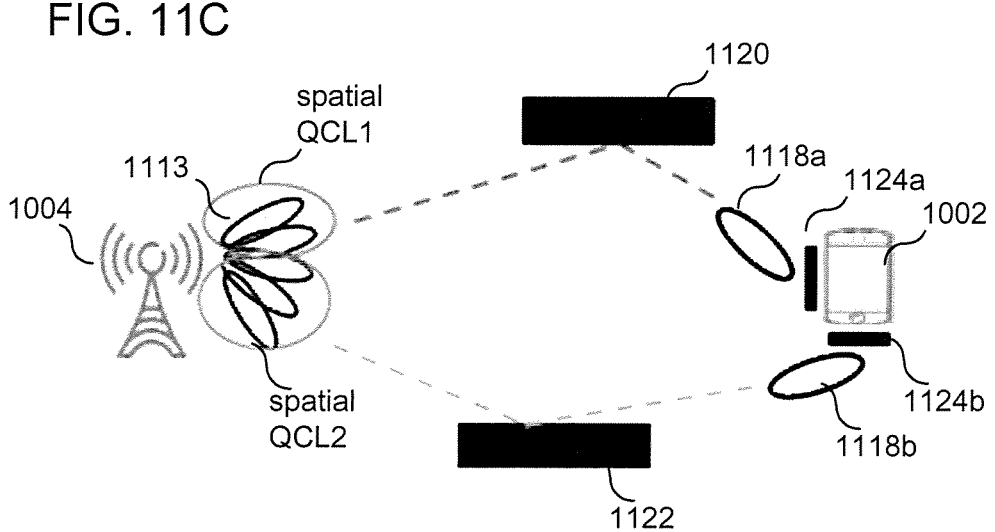

FIGS. 11A-11C illustrate three different embodiments for how the UE 1002 may determine a suitable RX spatial filter in the case where the CSI-RS resource set used for channel measurement contains CSI-RS resources with two different spatial QCL references. In FIGS. 11A-11C, the two different spatial QCL references are identified as spatial QCL 1 and spatial QCL 2. In the non-limiting examples shown in FIGS. 11A-11C, two of the five TRP TX beams 1113 have spatial QCL 1, and three of the five TRP TX beams 1113 have spatial QCL 2. The non-limiting examples shown in FIGS. 11A-11C include walls 1120 and 1122, which cause reflection. In each embodiment, it is assumed that the UE 1002 already has determined suitable narrow beams for respective spatial QCL references (e.g., from one or more earlier UE RX beam sweeps (see FIG. 3B)).

In the embodiment shown in FIG. 11A, the UE 1002 is equipped with one UE panel 1124, and the UE 1002 may determine an RX spatial filter that generates high antenna gain in both directions indicated by the two different spatial QCL references (e.g., spatial QCL 1 and spatial QCL 2). In some non-limiting embodiments, the UE 1002 may determine an RX spatial filter that generates high antenna gain in both directions by adding the complex antenna weights for the two pre-determined narrow UE beams associated with the two spatial QCL references. For example, in some non-limiting embodiments, if the complex weights for the two pre-determined narrow UE beams are w1 and w2, the UE 1002 may determine a new complex antenna weights (w3) for the new UE beam 1114 as w3=w1+w2. Usually, with this method, the complex weights w3 of the new beam 1114 may have slightly different amplitude for the different antenna elements within the UE panel 1124, which may reduce the received power slightly. In some alternative embodiments, the UE 1002 may determine the complex antenna weights of the new UE beam 1114 by using an optimization tool that evaluates different phase settings and designs a resulting radiation pattern of the UE panel 1114 that has high gain in both directions of the two pre-determined narrow UE beams. In some embodiments, these optimized complex weights that combine multiple narrow beams could be either pre-calculated or calculated during operation. In other alternative embodiments, the UE 1002 may determine the complex antenna weights using dual-polarized beamforming, which is very flexible in generating beams with different shapes without losing much received power due to amplitude tapering.

In the embodiment shown in FIG. 11B, the UE 1002 may determine an RX spatial filter that generates a wide beam 1116 from the UE panel 1124. In some non-limiting embodiments, the wide beam 1116 may be as wide as possible for the UE panel 1124. In some embodiments, the wide beam 1116 may enable the UE 102 to receive signals from all the directions indicated by the spatial QCL references (e.g., spatial QCL 1 and spatial QCL 2).

In the embodiment shown in FIG. 11C, the UE 1002 is equipped with multiple UE panels (e.g., UE panels 1124a and 1124b). In this case, the UE 101 may determine an RX spatial filter that includes a first RX spatial filter for a first UE panel (e.g., UE panel 1124a) to receive signals from a first spatial QCL direction (e.g., spatial QCL1) and a second RX spatial filter for a second UE panel (e.g., UE panel 1124b) to receive signals from a second spatial QCL direction (e.g., spatial QCL2). In some embodiments, the first RX spatial filter for the first UE panel may be based only on the first spatial QCL direction (and not the second spatial QCL direction), and the second RX spatial filter for the second UE panel may be based only on the second spatial QCL direction (and not the first spatial QCL direction). In some embodiments, the UE 1002 may apply the determined RX spatial filter that includes the first RX spatial filter for the first UE panel and the second RX spatial filter for second UE panel (e.g., in step s1009), measure one or more CSI-RS resources associated with the first spatial QCL direction using the first UE panel and the first RX spatial filter based only on the first spatial QCL direction, and measure one or more CSI-RS resources associated with the second spatial QCL direction using the second UE panel and the second RX spatial filter based only on the second spatial QCL direction.

In some embodiments, as shown in FIG. 10, the UE 1002 performs the RX spatial filter determination step s1005 after the TRP 1004 triggers the beam sweep in step s1003. However, this is not required, and, in some alternative embodiments, the UE 1002 may perform the RX spatial filter determination step s1005 at a different time. For example, in some alternative embodiments, the UE 1002 may perform the RX spatial filter determination step s1005 after the TRP 1004 configures the UE 1002 with the TRP TX beam sweep in step s1001 and before the TRP 1004 triggers the beam sweep in step s1003.

In some embodiments, the process 1000 may include a step s1007 in which the TRP 1004 transmits the CSI-RS resources for the TRP TX beam sweep. In some embodiments, the CSI-RS resources for the TRP TX beam sweep include both the CSI-RS resources belonging to the CSI-RS resource set intended for channel measurements and the CSI-RS resources belonging to the CSI-RS resource set intended for interference measurements. In some non-limiting embodiments, to save overhead, the TRP 1004 may transmit the CSI-RS resources from both sets simultaneously from two different TRP TX panels. In some embodiments, the process 1000 may be applied to two UEs (see FIGS. 8 and 9), and both UEs can may perform measurements on the same CSI-RS resources to reduce the overhead even further. In embodiments in which the process 1000 is applied to two UEs, the CSI-RS resources that are used for channel measurements for one UE may be used for interference measurements for the second UE and vice versa.

In some embodiments, the process 1000 may include a step s1009 in which the UE 1002 applies the RX spatial filter determined in step s1005 when receiving the CSI-RS resources belonging to the TRP TX beam sweep. In some embodiments, the UE 1002 may apply the RX spatial filter determined in step s1005 for all CSI-RS resources (including both CSI-RS resources for channel measurements and CSI-RS resources for interference measurements) during the TRP TX beam sweep. In some embodiments, the UE 1002 may calculate the SIR (or SINR) for each TRP TX beam combination, where each TRP TX beam combination includes one TRP TX beam from the CSI-RS resource set intended for channel measurements and one TRP TX beam from the CSI-RS resource set intended for interference measurements. For example, if there are 4 CSI-RS resources in each of the two CSI-RS resource sets, there would be 16 possible combinations because each of the four CSI-RS resources in one CSI-RS set can be combined with each one of the four CSI-RS resources in the second CSI-RS set. In some non-limiting embodiments, the UE 1002 may assume the same interference rejection combining (IRC) receiver filter that it would assume for PDSCH transmission. In some embodiments, assuming the same IRC receiver filter that it would assume for PDSCH transmission may prevent the problem that was identified with Rel-15 beam management framework from occurring here as well.

In some embodiments, the process 1000 may include a step s1011 in which the UE 1002 signals back N CSI-RS resource indicator (CRI) pairs to the TRP 1004. In some embodiments, the N CSI-RS resource indicator (CRI) pairs may correspond to the N TRP TX beam pairs with highest SIR. In some embodiments, each TRP TX beam pair may include one TRP TX beam from the CSI-RS resource set intended for channel measurements and one TRP TX beam from the CSI-RS resource set intended for interference measurements.

In some embodiments, the process 1000 may include a step s1013 in which the TRP 1004 evaluates if there exist any suitable TRP TX beam pair that could be used for MU-MIMO transmission for two or more UEs.

Figure 12:
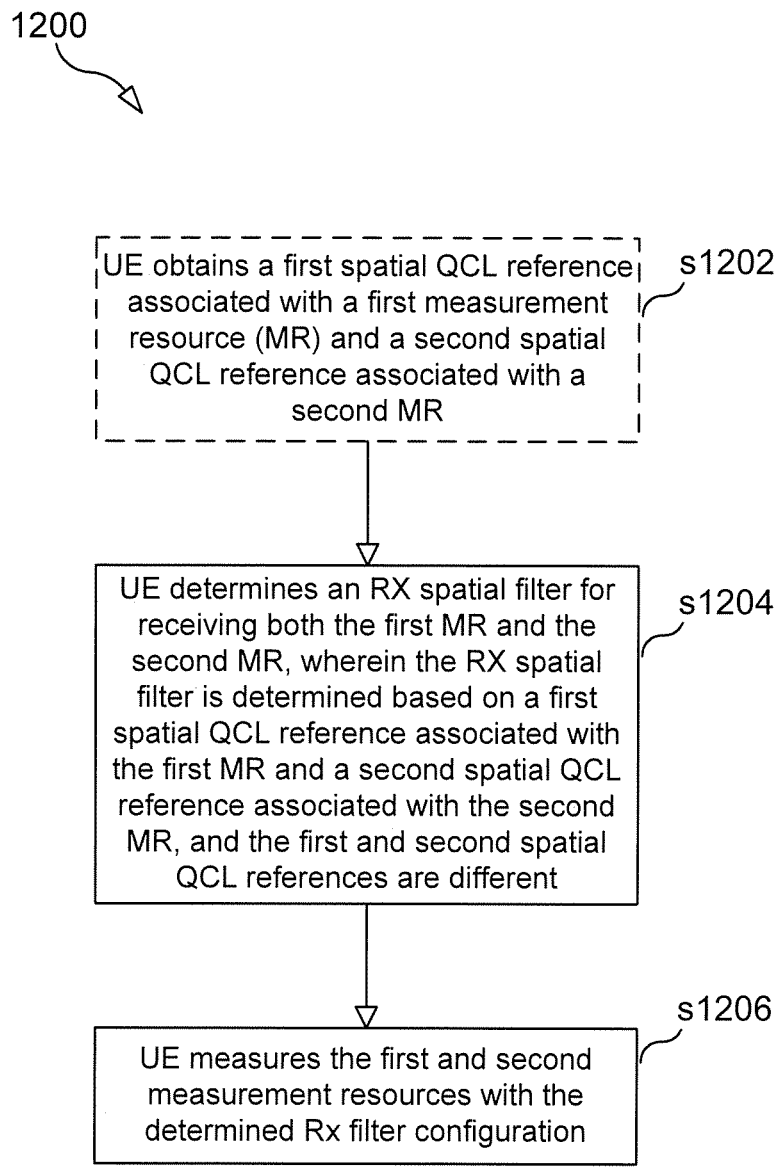
FIG. 12 is a flow chart illustrating a process according to an embodiment.

FIG. 12 is a flow chart illustrating a process 1200, according to one embodiment, for measuring measurement resources using an RX filter configuration. In some embodiments, the process 1200 may optionally include a step s1202 in which a UE (e.g., UE 1002) obtains a first spatial QCL reference associated with a first measurement resource and a second spatial QCL reference associated with a second measurement resource. In some embodiments, the process 1200 may include a step s1204 in which the UE determines an RX spatial filter for receiving both the first measurement resource and the second measurement resource. In some embodiments, the RX spatial filter may be determined based on a first spatial quasi-co-located (QCL) reference associated with the first measurement resource and a second spatial QCL reference associated with the second measurement resource, and the first and second spatial QCL references may be different. In some embodiments, the process 1200 may include a step s1206 in which the UE measures the first and second measurement resources with the determined Rx filter configuration.

Figure 13:
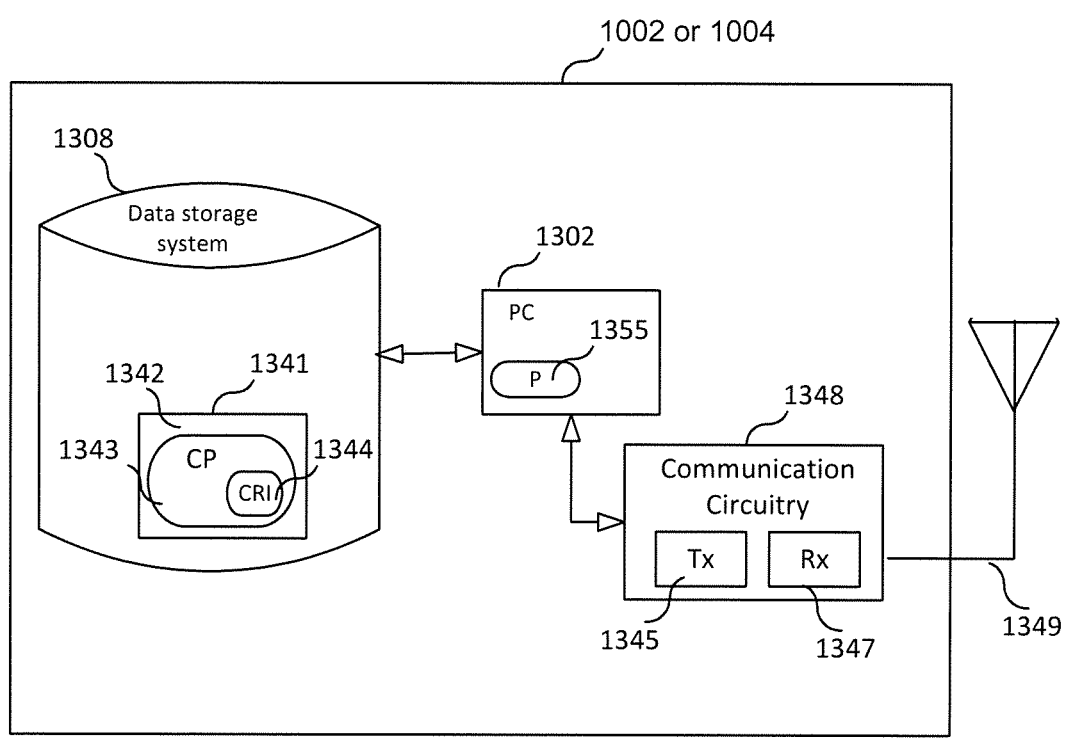
FIG. 13 is a block diagram of an apparatus according to one embodiment.

FIG. 13 is a block diagram of UE 1002 or TRP 1004, according to some non-limiting embodiments. As shown in FIG. 13, the UE 1002 and TRP 1004 may each comprise: processing circuitry (PC) 1302, which may include one or more processors (P) 1355 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; communication circuitry 1348 coupled to an antenna arrangement 1349 and comprising a transmitter (Tx) 1345 and a receiver (Rx) 1347 for enabling UE 1002 or TRP 1004 to transmit data and receive data (e.g., wirelessly transmit/receive data); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes UE 1002 or TRP 1004 to perform steps described herein (e.g., steps described herein with reference to the flow charts). In other embodiments, UE 1002 or TRP 1004 may be configured to perform steps described herein without the need for code. That is, for example, PC 1302 may consist merely of one or more ASICs. Hence, the features of the embodiments described herein may be implemented in hardware and/or software.

Figure 14:
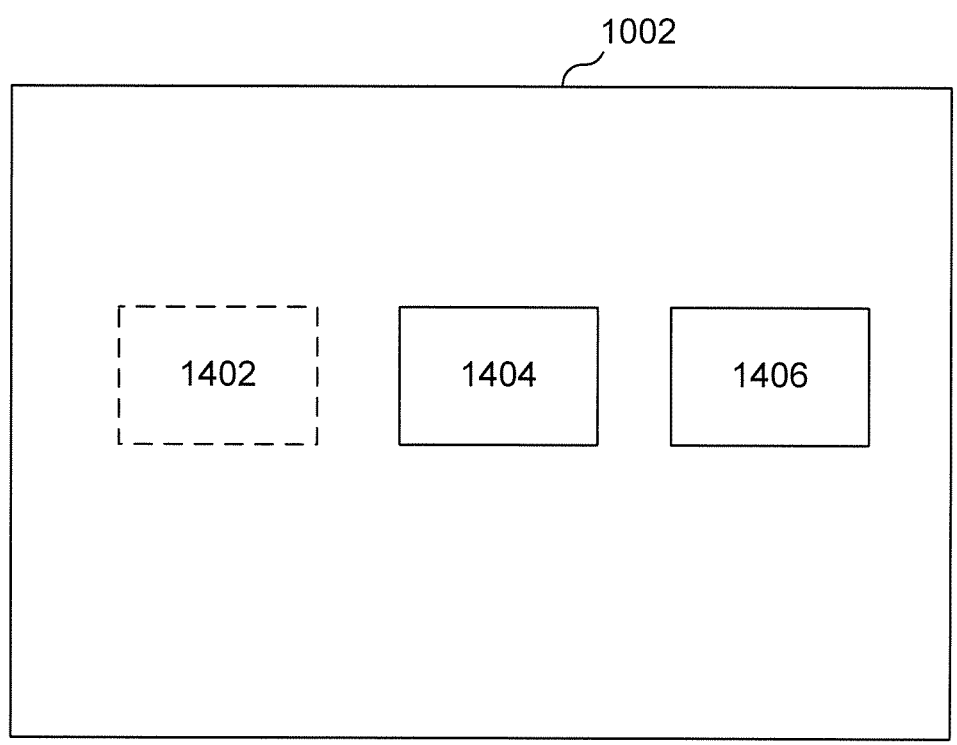
FIG. 14 is a block diagram of an apparatus according to one embodiment.

FIG. 14 is a block diagram of UE 1002 according to some non-limiting embodiments. As shown in FIG. 14, in some non-limiting embodiments, the UE 1002 may include a determining module 1404 for determining a receive (RX) spatial filter for receiving both a first measurement resource and a second measurement resource. In some embodiments, the RX spatial filter may be determined based on a first spatial quasi-co-located (QCL) reference associated with the first measurement resource and a second spatial QCL reference associated with the second measurement resource, and the first and second spatial QCL references may be different. In some non-limiting embodiments, the UE 1002 may include a measuring module 1406 for measuring the first and second measurement resources with the determined Rx filter configuration. In some non-limiting embodiments, the UE 1002 may optionally include an obtaining module 1402 for obtaining the first spatial QCL reference associated with the first measurement resource and the second spatial QCL reference associated with the second measurement resource.

Figure 15:
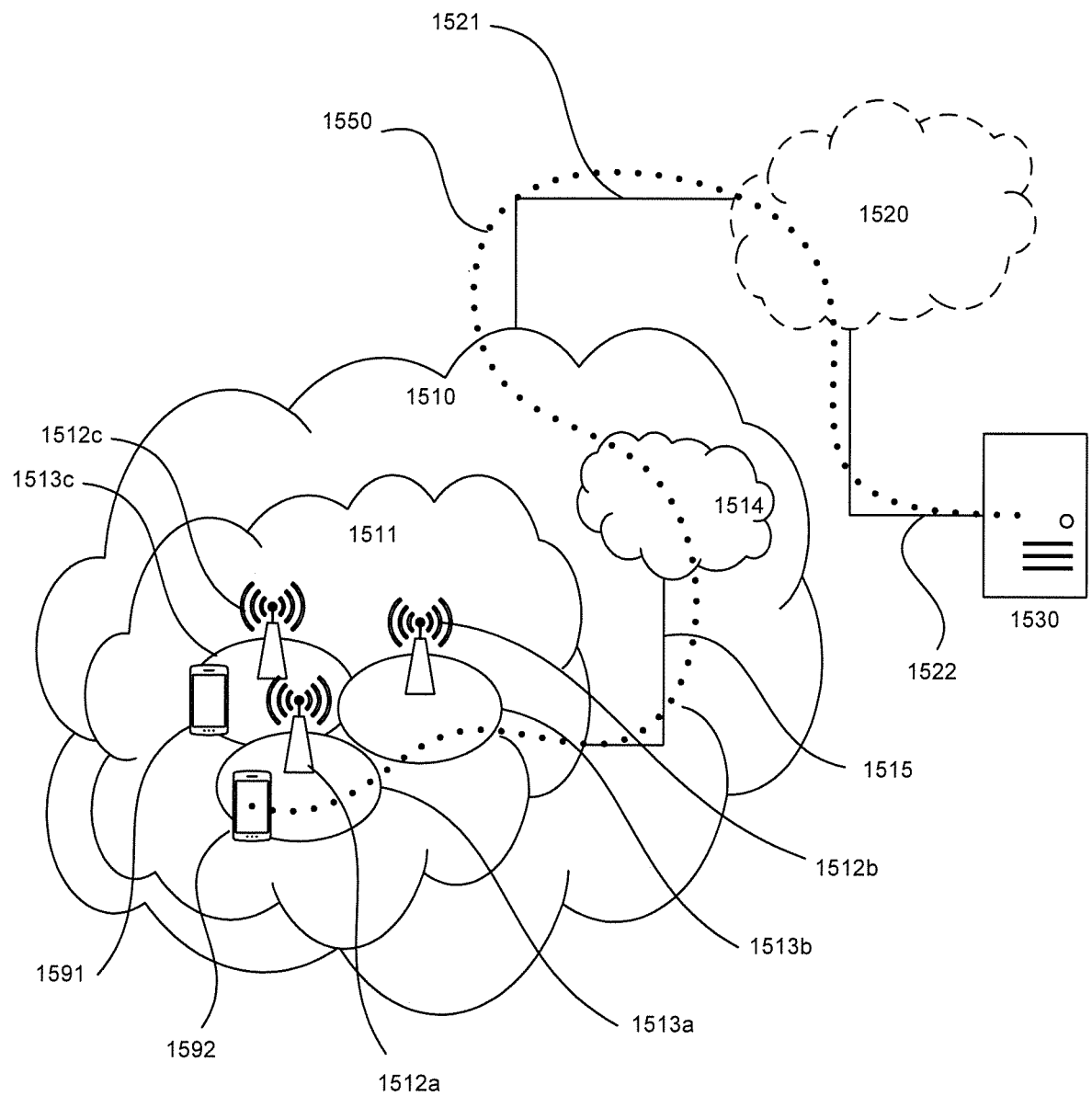
FIG. 15 schematically illustrates a telecommunication network connected via an intermediate network to a host computer.

FIG. 15 illustrates a telecommunication network connected via an intermediate network to a host computer in accordance with some embodiments. With reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of APs (hereafter base stations) 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Example implementations, in accordance with an embodiment, of the UE, base station and host computer discussed in the preceding paragraphs will now be described with reference to FIG. 16, which illustrates a host computer communicating via a base station with a user equipment over a partially wireless connection in accordance with some embodiments. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

Figure 16:
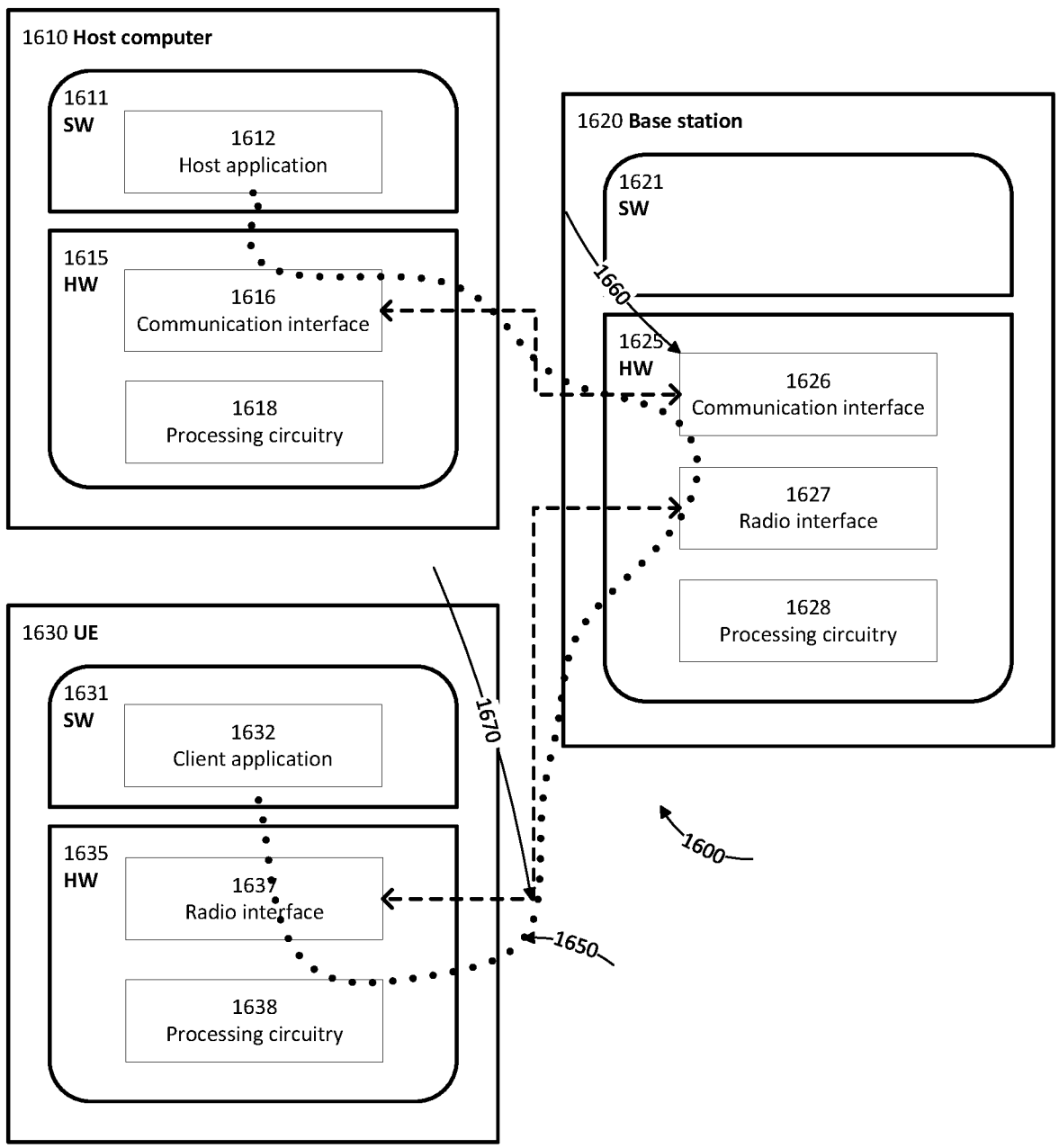
FIG. 16 is a generalized block diagram of a host computer communicating via a base station with a user equipment over a partially wireless connection.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
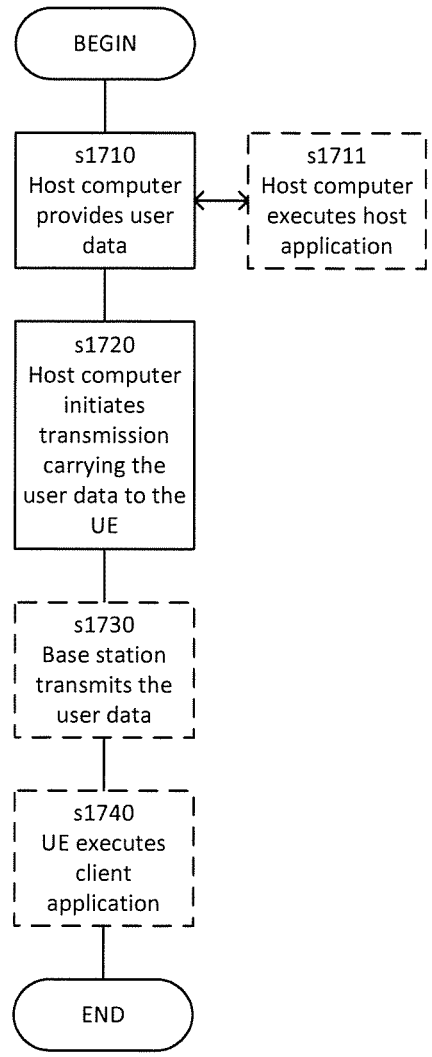
FIG. 17 is a flowchart illustrating a method implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIG. 15 and FIG. 16. In step S1710, the host computer provides user data. In substep S1711 (which may be optional) of step S1710, the host computer provides the user data by executing a host application. In step S1720, the host computer initiates a transmission carrying the user data to the UE. In step S1730 (which may be optional), the base station transmits to the UE the user data which was carried in the transmission that the host computer initiated, in accordance with the teachings of the embodiments described throughout this disclosure. In step S1740 (which may also be optional), the UE executes a client application associated with the host application executed by the host computer.

Figure 18:
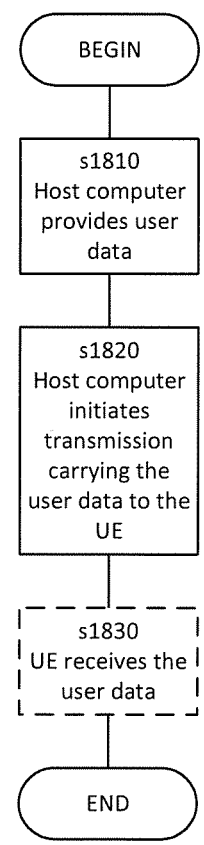
FIG. 18 is a flowchart illustrating a method implemented in a communication system including a host computer, a base station and a user equipment.

FIG. 18 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 18 will be included in this section. In step S1810 of the method, the host computer provides user data. In an optional substep (not shown) the host computer provides the user data by executing a host application. In step S1820, the host computer initiates a transmission carrying the user data to the UE. The transmission may pass via the base station, in accordance with the teachings of the embodiments described throughout this disclosure. In step S1830 (which may be optional), the UE receives the user data carried in the transmission.

Figure 19:
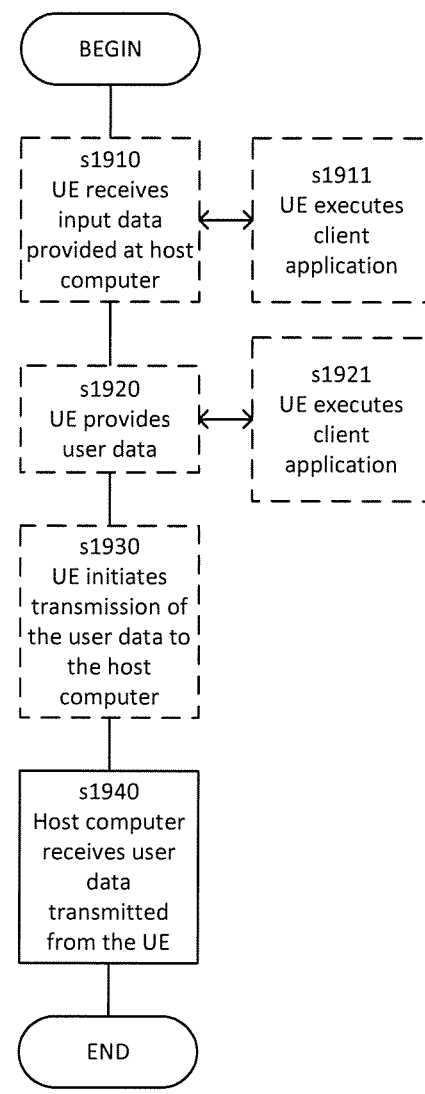
FIG. 19 is a flowchart illustrating a method implemented in a communication system including a host computer, a base station and a user equipment.

FIG. 19 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 19 will be included in this section. In step S1910 (which may be optional), the UE receives input data provided by the host computer. Additionally or alternatively, in step S1920, the UE provides user data. In substep S1921 (which may be optional) of step S1920, the UE provides the user data by executing a client application. In substep S1911 (which may be optional) of step S1910, the UE executes a client application which provides the user data in reaction to the received input data provided by the host computer. In providing the user data, the executed client application may further consider user input received from the user. Regardless of the specific manner in which the user data was provided, the UE initiates, in substep S1930 (which may be optional), transmission of the user data to the host computer. In step S1940 of the method, the host computer receives the user data transmitted from the UE, in accordance with the teachings of the embodiments described throughout this disclosure.

Figure 20:
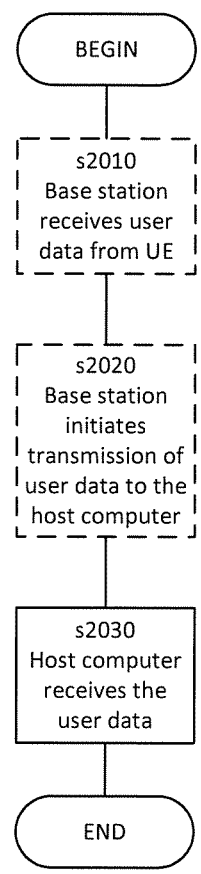
FIG. 20 is a flowchart illustrating a method implemented in a communication system including a host computer, a base station and a user equipment.

FIG. 20 is a flowchart illustrating a method implemented in a communication system, in accordance with one embodiment. The communication system includes a host computer, a base station and a UE which may be those described with reference to FIG. 15 and FIG. 16. For simplicity of the present disclosure, only drawing references to FIG. 20 will be included in this section. In step S2010 (which may be optional), in accordance with the teachings of the embodiments described throughout this disclosure, the base station receives user data from the UE. In step S2020 (which may be optional), the base station initiates transmission of the received user data to the host computer. In step S2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
 determining a receive (RX) spatial filter for receiving both a first measurement resource and a second measurement resource, wherein the RX spatial filter is determined based on a first spatial quasi-co-located (QCL) reference associated with the first measurement resource and a second spatial QCL reference associated with the second measurement resource, and the first and second spatial QCL references are different; and
 measuring the first and second measurement resources with the determined Rx filter configuration.

2. The method of claim 1, wherein determining the RX spatial filter comprises adding complex antenna weights for a first narrow beam associated with the first QCL reference and complex antenna weights for a second narrow beam associated with the second QCL reference.

3. The method of claim 1, wherein determining the RX spatial filter comprises evaluating different phase settings and designing a radiation pattern that has high gain in both a direction of a first narrow beam associated with the first QCL reference and a direction of a second narrow beam associated with the second QCL reference.

4. The method of claim 1, wherein determining the RX spatial filter comprises using dual-polarized beamforming to find complex antenna weights for the RX spatial filter.

5. The method of claim 1, wherein the determined RX spatial filter generates a wide beam from an antenna panel of the UE, and the wide beam enables the UE to receive signals from directions indicated by the first and second spatial QCL references.

6. The method of claim 1, wherein the determined RX spatial filter includes a first RX spatial filter for a first antenna panel of the UE to receive signals from a direction indicated by the first spatial QCL reference and a second RX spatial filter for a second antenna panel of the UE to receive signals from a direction indicated by the second spatial QCL reference, wherein the first and second antenna panels are separate and distinct antenna panels.

7. The method of claim 1, further comprising receiving downlink control information (DCI) indicating a triggered aperiodic trigger state from a plurality of aperiodic trigger states, wherein the first and second measurement resources are triggered by the indicated triggered aperiodic trigger state.

8. The method of claim 1, wherein:
 the UE is configured with a list of trigger states;
 each trigger state of the list of trigger states includes a first resource set including one or more measurement resources for channel measurements, a second resource set including one or more measurement resources, and one or more spatial QCL references associated with the one or more measurement resources for channel measurements;
 the list of trigger states includes a first trigger state;
 the first resource set of the first trigger state includes the first and second measurement resources;
 the first trigger state includes the first and second spatial QCL resources; and
 the method further comprises receiving an indication of the first trigger state of the list of trigger states, which results in the RX spatial filter being determined based on the first spatial QCL reference associated with the first measurement resource and the second spatial QCL reference associated with the second measurement resource.

9. The method of claim 8, wherein the one or more measurement resources of the first resource set of each trigger state of the list of trigger states and the one or more measurement resources of the second resource set of each trigger state of the list of trigger states are channel state information reference signals (CSI-RSs).

10. A user equipment (UE), the UE being adapted to:
 determine a receive (RX) spatial filter for receiving both a first measurement resource and a second measurement resource, wherein the RX spatial filter is determined based on a first spatial quasi-co-located (QCL) reference associated with the first measurement resource and a second spatial QCL reference associated with the second measurement resource, and the first and second spatial QCL references are different; and
 measure the first and second measurement resources with the determined Rx filter configuration.

11. The UE of claim 10, wherein determining the RX spatial filter comprises adding complex antenna weights for a first narrow beam associated with the first QCL reference and complex antenna weights for a second narrow beam associated with the second QCL reference.

12. The UE of claim 10, wherein determining the RX spatial filter comprises evaluating different phase settings and designing a radiation pattern that has high gain in both a direction of a first narrow beam associated with the first QCL reference and a direction of a second narrow beam associated with the second QCL reference.

13. The UE of claim 10, wherein determining the RX spatial filter comprises using dual-polarized beamforming to find complex antenna weights for the RX spatial filter.

14. The UE of claim 10, comprising an antenna panel, wherein the determined RX spatial filter generates a wide beam from the antenna panel, and the wide beam enables the UE to receive signals from directions indicated by the first second spatial QCL references.

15. The UE of claim 10, comprising a first antenna panel and a second antenna panel that is separate and distinct from the first antenna panel, wherein the determined RX spatial filter includes a first RX spatial filter for the first antenna panel to receive signals from a direction indicated by the first spatial QCL reference and a second RX spatial filter for the second antenna panel to receive signals from a direction indicated by the second spatial QCL reference.

16. The UE of claim 15, wherein the first RX spatial filter for the first antenna panel is determined based on the first spatial QCL reference and is not determined based on the second spatial QCL reference, and the second RX spatial filter for the second antenna panel is determined based on the second spatial QCL reference and is not determined based on the first spatial QCL reference.

17. The UE of claim 10, wherein the UE is further adapted to receive downlink control information (DCI) indicating a triggered aperiodic trigger state from a plurality of aperiodic trigger states, and the first and second measurement resources are triggered by the indicated triggered aperiodic trigger state.

18. The UE of claim 10, wherein:
 the UE is configured with a list of trigger states;
 each trigger state of the list of trigger states includes a first resource set including one or more measurement resources for channel measurements, a second resource set including one or more measurement resources, and one or more spatial QCL references associated with the one or more measurement resources for channel measurements;

the list of trigger states includes a first trigger state;

the first resource set of the first trigger state includes the first and second measurement resources;

the first trigger state includes the first and second spatial QCL resources; and the UE is further adapted to receive an indication of the first trigger state of the list of trigger states, which results in the RX spatial filter being determined based on the first spatial QCL reference associated with the first measurement resource and the second spatial QCL reference associated with the second measurement resource.

19. The UE of claim 18, wherein the one or more measurement resources of the first resource set of each trigger state of the list of trigger states and the one or more measurement resources of the second resource set of each trigger state of the list of trigger states are channel state information reference signals (CSI-RSs).

20. The UE of claim 10, wherein the UE comprises a transmitter, a receiver, processing circuitry, and a non-transitory computer readable medium (CRM), and the CRM contains instructions that, when executed by the processing circuitry, causes the UE to determine the RX spatial filter and measure the first and second measurement resources.

* * * * *

UNITED STATES PATENT AND TRADEMARK OFFICE
CERTIFICATE OF CORRECTION

PATENT NO. : 11,811,484 B2
APPLICATION NO. : 17/607997
DATED : November 7, 2023
INVENTOR(S) : Nilsson et al.

It is certified that error appears in the above-identified patent and that said Letters Patent is hereby corrected as shown below:

In the Specification

In Column 1, Line 49, delete "reference-signal receive power (RSRP)" and insert -- reference signal received power (RSRP) --, therefor.

In Column 2, Line 49, delete "downlink data transmission (PDSCH)," and insert -- physical downlink shared channel (PDSCH), --, therefor.

In Column 3, Line 10, delete "physical broadcast control channel" and insert -- physical broadcast channel --, therefor.

In Column 3, Lines 30-31, delete "reference-signal receive power (RSRP)" and insert -- reference signal received power (RSRP) --, therefor.

In Column 3, Line 64, delete "downlink data transmission (PDSCH)." and insert -- physical downlink shared channel (PDSCH). --, therefor.

In Column 5, Lines 42-43, delete "precoder matrix indicator (PMI)," and insert -- precoding matrix indicator (PMI), --, therefor.

In Column 7, Line 49, delete "on" and insert -- one --, therefor.

In Columns 7 & 8, in Table, Line 1, delete "ASNI START" and insert -- ASN1START --, therefor.

In Columns 7 & 8, in Table, Line 7, delete "(SIZE(l..max" and insert -- (SIZE(1..max --, therefor.

In Columns 7 & 8, in Table, Line 11, delete "reportConfigld" and insert -- reportConfigId --, therefor.

In Columns 7 & 8, in Table, Line 16, delete "(SIZE(l..max" and insert -- (SIZE(1..max --, therefor.

Signed and Sealed this
Nineteenth Day of March, 2024

Katherine Kelly Vidal
*Director of the United States Patent and Trademark Office*

CERTIFICATE OF CORRECTION (continued)
U.S. Pat. No. 11,811,484 B2

In Columns 7 & 8, in Table, Line 18, delete "TCI-StateId" and insert -- TCI-StateId --, therefor.

In Columns 7 & 8, in Table, Line 20, delete "(1 ..max" and insert -- (1..max --, therefor.

In Columns 7 & 8, in Table, Line 25, delete "ResourcesForlnterference" and insert -- ResourcesForInterference --, therefor.

In Columns 7 & 8, in Table, Line 25, delete "(L.max" and insert -- (1.max --, therefor.

In Columns 7 & 8, in Table, Line 26, delete "Forlnterference" and insert -- ForInterference --, therefor.

In Column 22, Line 67, delete "block error ratio (BLER)," and insert -- block error rate (BLER), --, therefor.

In Column 24, Line 8, delete "51911" and insert -- S1911 --, therefor.